US009225945B2

(12) United States Patent
Sekiguchi et al.

(10) Patent No.: US 9,225,945 B2
(45) Date of Patent: Dec. 29, 2015

(54) MOVING PICTURE ENCODER AND ENCODING METHOD

(75) Inventors: Shunichi Sekiguchi, Tokyo (JP); Kohtaro Asai, Tokyo (JP); Tokumichi Murakami, Tokyo (JP); Hirofumi Nishikawa, Tokyo (JP); Shinichi Kuroda, Tokyo (JP); Yoshimi Isu, Tokyo (JP); Yuri Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/932,735

(22) Filed: Oct. 31, 2007

(65) Prior Publication Data

US 2008/0063073 A1 Mar. 13, 2008

Related U.S. Application Data

(62) Division of application No. 10/642,508, filed on Aug. 18, 2003, which is a division of application No. 09/142,577, filed as application No. PCT/JP98/00232 on Jan. 22, 1998.

(30) Foreign Application Priority Data

Feb. 13, 1997 (JP) ......................................... 9-28862

(51) Int. Cl.
*H04N 7/24* (2011.01)
*H04N 19/105* (2014.01)
(Continued)

(52) U.S. Cl.
CPC ............... *H04N 7/24* (2013.01); *H04N 19/105* (2014.11); *H04N 19/127* (2014.11);
(Continued)

(58) Field of Classification Search
CPC .................. H04N 19/00103; H04N 19/00145; H04N 19/00727; H04N 19/00575; H04N 19/00745; H04N 19/00484; H04N 7/50; H04N 7/26244; H04N 7/26031; H04N 7/26015; H04N 7/26707

USPC ............ 375/240.14, 240.06, 240.17, 240.26, 375/240.25, 240.22; 714/800; 386/124
See application file for complete search history.

(56) References Cited

U.S. PATENT DOCUMENTS

| 4,460,923 A | 7/1984 | Hirano et al. |
| 4,546,386 A | 10/1985 | Matsumoto et al. |

(Continued)

FOREIGN PATENT DOCUMENTS

| CN | 1115953 A | 1/1996 |
| EP | 634872 A2 | 1/1995 |

(Continued)

OTHER PUBLICATIONS

Sawhney, Harpeet S., et al., Compact Representations of Videos Through Dominant and Multiple Motion Estimation, (1996), IEEE Transactions on Pattern Analysis and Machine Intelligence, vol. 18, No. 8, Aug. 1996, pp. 814-830.

(Continued)

*Primary Examiner* — Tung Vo
(74) *Attorney, Agent, or Firm* — Birch, Stewart, Kolasch & Birch, LLP

(57) ABSTRACT

A moving picture encoder and encoding method for encoding a moving picture signal are disclosed. The moving picture encoder includes a plurality of reference picture memory areas, each area storing picture data of a reference picture to be used for prediction; and a prediction picture generator including a motion compensator that generates the predicted picture by using the picture data stored in the reference picture memory area, a parameter representing a motion between an image to be predicted and the reference picture and prediction mode information indicating a prediction mode corresponding to a prediction method used for generating a predicted picture, and a memory updater that controls a timing of updating the picture data of a full frame stored in the reference picture memory area; and a multiplexer that multiplexes an information representing memory update in a bitstream.

2 Claims, 37 Drawing Sheets

(51) Int. Cl.

| | |
|---|---|
| *H04N 19/503* | (2014.01) |
| *H04N 19/46* | (2014.01) |
| *H04N 19/196* | (2014.01) |
| *H04N 19/463* | (2014.01) |
| *H04N 19/127* | (2014.01) |
| *H04N 19/137* | (2014.01) |
| *H04N 19/142* | (2014.01) |
| *H04N 19/186* | (2014.01) |
| *H04N 19/179* | (2014.01) |
| *H04N 19/44* | (2014.01) |
| *H04N 19/23* | (2014.01) |
| *H04N 19/423* | (2014.01) |
| *H04N 19/537* | (2014.01) |
| *H04N 19/87* | (2014.01) |
| *H04N 19/573* | (2014.01) |
| *H04N 19/58* | (2014.01) |
| *H04N 19/61* | (2014.01) |

(52) U.S. Cl.
CPC .......... *H04N 19/137* (2014.11); *H04N 19/142* (2014.11); *H04N 19/179* (2014.11); *H04N 19/186* (2014.11); *H04N 19/196* (2014.11); *H04N 19/23* (2014.11); *H04N 19/423* (2014.11); *H04N 19/44* (2014.11); *H04N 19/46* (2014.11); *H04N 19/463* (2014.11); *H04N 19/503* (2014.11); *H04N 19/537* (2014.11); *H04N 19/573* (2014.11); *H04N 19/58* (2014.11); *H04N 19/87* (2014.11); *H04N 19/61* (2014.11)

(56) References Cited

U.S. PATENT DOCUMENTS

| | | | |
|---|---|---|---|
| 5,018,134 A | 5/1991 | Kokubo et al. | |
| 5,151,784 A | 9/1992 | Lavagetto et al. | |
| 5,247,363 A * | 9/1993 | Sun et al. | 348/616 |
| 5,353,062 A * | 10/1994 | Maeda | 375/240.14 |
| 5,374,958 A | 12/1994 | Yanagihara | |
| 5,420,638 A | 5/1995 | Riglet et al. | |
| 5,428,396 A | 6/1995 | Yagasaki et al. | |
| 5,481,553 A * | 1/1996 | Suzuki et al. | 714/800 |
| 5,488,419 A * | 1/1996 | Hui et al. | 375/240.17 |
| 5,488,482 A | 1/1996 | Ueda et al. | |
| 5,515,388 A * | 5/1996 | Yagasaki | 714/800 |
| 5,543,847 A | 8/1996 | Kato et al. | |
| 5,576,765 A * | 11/1996 | Cheney et al. | 375/240.02 |
| 5,576,767 A | 11/1996 | Lee et al. | |
| 5,592,228 A * | 1/1997 | Dachiku et al. | 348/416.1 |
| 5,598,216 A | 1/1997 | Lee et al. | |
| 5,646,690 A * | 7/1997 | Yoon | 375/240.17 |
| 5,647,049 A * | 7/1997 | Odaka et al. | 386/124 |
| 5,657,087 A | 8/1997 | Jeong et al. | |
| 5,668,599 A * | 9/1997 | Cheney et al. | 375/240.15 |
| 5,684,538 A * | 11/1997 | Nakaya et al. | 375/240.17 |
| 5,692,063 A * | 11/1997 | Lee et al. | 382/107 |
| 5,694,172 A | 12/1997 | Miyano | |
| 5,699,474 A | 12/1997 | Suzuki et al. | |
| 5,717,441 A | 2/1998 | Serizawa et al. | |
| 5,717,462 A | 2/1998 | Hayashi | |
| 5,719,986 A | 2/1998 | Kato et al. | |
| 5,729,303 A | 3/1998 | Oku et al. | |
| 5,760,846 A * | 6/1998 | Lee | 348/699 |
| 5,764,553 A * | 6/1998 | Hong | 708/400 |
| 5,767,911 A * | 6/1998 | Boon | 375/240.12 |
| 5,768,438 A * | 6/1998 | Etoh | 382/251 |
| 5,815,646 A * | 9/1998 | Purcell et al. | 345/502 |
| 5,835,147 A | 11/1998 | Florentin et al. | |
| 5,844,614 A * | 12/1998 | Chong et al. | 375/240.24 |
| 5,854,799 A * | 12/1998 | Okada et al. | 714/781 |
| 5,870,087 A | 2/1999 | Chau | |
| 5,883,674 A | 3/1999 | Ogura | |
| 5,886,742 A * | 3/1999 | Hibi et al. | 375/240.16 |
| 5,910,824 A | 6/1999 | Yu | |
| 5,946,043 A | 8/1999 | Lee et al. | |
| 5,959,672 A | 9/1999 | Sasaki et al. | |
| 5,963,673 A * | 10/1999 | Kodama et al. | 382/239 |
| 6,064,803 A * | 5/2000 | Watabe et al. | 358/1.17 |
| 6,081,551 A | 6/2000 | Etoh | |
| 6,084,908 A * | 7/2000 | Chiang et al. | 375/240.03 |
| 6,084,912 A | 7/2000 | Reitmeier et al. | |
| 6,157,745 A * | 12/2000 | Salembier | 382/236 |
| 6,167,158 A | 12/2000 | Boon et al. | |
| 6,169,821 B1 | 1/2001 | Fukunaga et al. | |
| 6,175,592 B1 | 1/2001 | Kim et al. | |
| 6,205,177 B1 * | 3/2001 | Girod et al. | 375/240.14 |
| 6,205,178 B1 | 3/2001 | Suzuki et al. | |
| 6,208,690 B1 | 3/2001 | Tomizawa | |
| 6,222,882 B1 | 4/2001 | Lee et al. | |
| 6,249,318 B1 | 6/2001 | Girod et al. | |
| 6,275,532 B1 * | 8/2001 | Hibi et al. | 375/240.17 |
| 6,320,909 B1 * | 11/2001 | Takabatake et al. | 375/240.25 |
| 6,370,276 B2 | 4/2002 | Boon | |
| 6,381,275 B1 * | 4/2002 | Fukuhara et al. | 375/240.06 |
| 6,415,056 B1 * | 7/2002 | Boon | 382/238 |
| 6,425,056 B2 | 7/2002 | Meyer | |
| 6,704,360 B2 | 3/2004 | Haskell et al. | |
| 6,763,071 B1 | 7/2004 | Maeda et al. | |
| 6,775,326 B2 | 8/2004 | Sekiguchi et al. | |

FOREIGN PATENT DOCUMENTS

| | | | |
|---|---|---|---|
| EP | 719049 A2 | 6/1996 | |
| EP | 731608 A2 | 9/1996 | |
| EP | 0817491 A1 | 1/1998 | |
| JP | 2-171093 A | 7/1990 | |
| JP | 4-127689 A | 4/1992 | |
| JP | 7-184206 A | 7/1995 | |
| JP | 7-226917 A | 8/1995 | |
| JP | 7-336461 A | 12/1995 | |
| JP | 172631 A8 | 7/1996 | |
| JP | 9-121358 A | 5/1997 | |
| WO | WO-89/04101 A1 | 5/1989 | |

OTHER PUBLICATIONS

Supplementary European Search Report dated Mar. 12, 2004 for EP 9890693.
MPEG-4 Video Verification Model Version 5.0, ISO/IEC JTC1/SC29/WG11 MPEG96/N1469, Nov. 1996, p. 1-191, XP002289780.
Marco Winzker et al.; "Architecture and Memory Requirements for stand-alone and hierarchical MPEG2 HDTV-Decoders with Synchronous DRAMs"; XP 000583293; IEEE; 1995; pp. 609-612.
Randall L. Hyde; "Overview of Memory Management"; XP-001002978; Byte; Apr. 1988; pp. 219-225.
Jozawa, Hiroshia, "Coding Efficiency of MPEG-4 Video," Proceedings of the Institute of Television Engineers, Dec. 1996, pp. 39-44.
"MPEG-4 Video Verification Model Version 5.0", pp. 1-14, 43-56, 71-74, and 87-94, Nov. 1996.
Nyozawa, Hironao, "Preprints of 1996 Winter Meeting of Image Media Section, the institute of Television Engineers of Japan", pp. 39-44, Dec. 4, 1996.
Dufaux, Frédéric et al., Background Mosaicking for Low Bit Rate Video Coding, Proceedings of the International Conference on Image Processing (ICIP) Lausanne, Sep. 16-19, 1996, New York, IEEE, vol. 1, pp. 673-676.
Irani, M., et al., Video Compression Using Mosaic Representations, Signal Processing Image Communication, Elsevier Science Publishers, Amsterdam, NL, vol. 7, No. 4, pp. 529-552.
Supplemental Partial European Search Report for EP 9890 0693, dated Jun. 5, 2003.
XP-001189151, International Standard/IEC 9899 (E), Section 7.10.3 Memory Management Functions, Dec. 15, 1990, Programming languages—C.
Michell, J. (1996), MPEG Video Compression Standard, Chapman and Hall, New York, pp. 21-22.

(56) References Cited

OTHER PUBLICATIONS

European Communication pursuant to Article 96(2) EPC for Application No. 98 900 693.7-1247.
Schiller H., et al., "Efficient Coding of Side Informatin in a Low Bit Rate Hybrid Image Coder".
Mitchell, J. (1996), MPEG Video Compression Standard, Chapman and Hall, New York, XP002304386, pp. 21-30.
Hirohisa Jozawa, et al. "Results of Core Experiment P1"; ITU Study Group 16—Video Coding Experts Group—ISO/IEC MPEG & ITU-T VCEG (ISO/IEC JTC1/SC29/WG11 and ITU-T SG16 06), No. M1428, Nov. 11, 1996; XP030030723; pp. 1-8.
Takahiro Fukuhara, et al. "Results of Core Experiment P2 and P3", ITU Study Group 16—Video Coding Experts Group—ISO/IEC MPEG & ITU-T VCEG (ISO/IEC JTC1/SC29/WG11 and ITU-T SG16 06), No. M1506, Nov. 14, 1996; XP030030801; pp. 1-19.

* cited by examiner

Fig.33

| VOP TYPE | NO PREDICTION | PAST VOP BASED PREDICTION | PAST AND FUTURE VOP BASED PREDICTION | SPRITE BASED PREDICTION |
|---|---|---|---|---|
| I - VOP | ○ | × | × | × |
| P - VOP | ○ | ○ | × | × |
| B - VOP | ○ | ○ | ○ | × |
| SPRITE - VOP | ○ | ○ | × | ○ |

MOVING PICTURE ENCODER AND ENCODING METHOD

CROSS REFERENCE PARAGRAPH

This application is a Divisional of co-pending application Ser. No. 10/642,508, filed on Aug. 18, 2003, which is a divisional of co-pending application Ser. No. 09/142,577, filed on Sep. 29, 1998, which is a national phase under 35 U.S.C. §371 of International Application No. PCT/JP98/00232, which has an international filing date of Jan. 22, 1998, the entire contents of which are hereby incorporated by reference and for which priority is claimed under 35 U.S.C. §120.

TECHNICAL FIELD

The present invention relates to the prediction of a moving picture implemented, for example, in a moving picture encoder/decoder used in a portable/stationary video communication device and the like for visual communications in a video telephone system, a video conference system or the like, a moving picture encoder/decoder used in a picture storage/recording apparatus such as a digital VTR and a video server, and a moving picture encoding/decoding program implemented in the form of a single software or a firmware as a Digital Signal Processor (DSP).

BACKGROUND ART

MPEG-4 (Moving Picture Experts Group Phase-4) Video Encoding/Decoding Verification Model (hereinafter referred to by the initials VM) whose standardization is in progress by ISO/IEC JTC1/SC29/WG11 may be introduced as a conventional type of predictive encoding/decoding in an encoding/decoding system of moving pictures. The VM continues to revise its contents according to the progress being made in standardization of MPEG-4. Here, Version 5.0 of the VM is designated to represent the VM and will be simply referred to as VM hereinafter.

The VM is a system for encoding/decoding each video object as one unit in view of a moving picture sequence being an aggregate of video objects changing their shapes time-/space-wise arbitrarily. FIG. 29 shows a VM video data structure. According to the VM, a time-based moving picture object is called a Video Object (VO), and picture data representing each time instance of the VO, as an encoding unit, is called a Video Object Plane (VOP). If the VO is layered in time/space, a special unit called a Video Object Layer (VOL) is provided between the VO and the VOP for representing a layered VO structure. Each VOP includes shape information and texture information to be separated. If the moving picture sequence includes a single VO, then the VOP is equated to a frame. There is no shape information included, in this case, and the texture information alone is then to be encoded/decoded.

The VOP includes alpha data representing the shape information and texture data representing the texture information, as illustrated in FIG. 30. Each data are defined as an aggregate of blocks (alphablocks/macroblocks), and each block in the aggregate is composed of 16×16 samples. Each alphablock sample is represented in eight bits. A macroblock includes accompanied chrominance signals being associated with 16×16 sample luminance signals. VOP data are obtained from a moving picture sequence externally processed outside of an encoder.

FIG. 31 is a diagram showing the configuration of a VOP encoder according to the VM encoding system. The diagram includes original VOP data P1 to be inputted, an alphablock P2 representing the shape information of the VOP, a switch P3a for passing the shape information, if there is any, of the inputted original VOP data, a shape encoder P4 for compressing and encoding the alphablock, compressed alphablock data P5, a locally decoded alphablock P6, texture data (a macroblock) P7, a motion detector P8, a motion parameter P9, a motion compensator P10, a predicted picture candidate P11, a prediction mode selector P12, a prediction mode P13, a predicted picture P14, a prediction error signal P15, a texture encoder P16, texture encoding information P17, a locally decoded prediction error signal P18, a locally decoded macroblock P19, a sprite memory update unit P20, a VOP memory P21, a sprite memory P22, a variable-length encoder/multiplexer P23, a buffer P24, and an encoded bitstream P25.

FIG. 32 shows a flowchart outlining an operation of the encoder.

Referring to the encoder of FIG. 31, the original VOP data P1 are decomposed into the alphablocks P2 and the macroblocks P7 (Steps PS2 and PS3). The alphablocks P2 and the macroblocks P7 are transferred to the shape encoder P4 and the motion detector P8, respectively. The shape encoder P4 is a processing block for data compression of the alphablock P2 (step PS4), the process of which is not discussed here further in detail because the compression method of shape information is not particularly relevant to the present invention.

The shape encoder P4 outputs the compressed alphablock data P5 which is transferred to the variable-length encoder/multiplexer P23, and the locally decoded alpha data P6 which is transferred sequentially to the motion detector P8, the motion compensator P10, the prediction mode selector P12, and the texture encoder P16.

The motion detector P8, upon reception of the macroblock P7, detects a local-motion vector on a macroblock basis using reference picture data stored in the VOP memory P21 and the locally decoded alphablock P6 (step PS5). Here, the motion vector is one example of a motion parameter. The VOP memory P21 stores the locally decoded picture of a previously encoded VOP. The content of the VOP memory P21 is sequentially updated with the locally decoded picture of a macroblock whenever the macroblock is encoded. In addition, the motion detector P8 detects a global warping parameter, upon reception of the full texture data of the original VOP, by using reference picture data stored in the sprite memory P22 and locally decoded alpha data. The sprite memory P22 will be discussed later in detail.

The motion compensator P10 generates the predicted picture candidate P11 by using the motion parameter P9, which is detected in the motion detector P8, and the locally decoded alphablock P6 (step PS6). Then, the prediction mode selector P12 determines the final of the predicted picture P14 and corresponding prediction mode P13 of the macroblock by using a prediction error signal power and an original signal power (step PS7). In addition, the prediction mode selector P12 judges the coding type of the data either intra-frame coding or inter-frame coding.

The texture encoder P16 processes the prediction error signal P15 or the original macroblock through Discrete Cosine Transformation (DCT) and quantization to obtain a quantized DCT coefficient based upon the prediction mode P13. An obtained quantized DCT coefficient is transferred, directly or after prediction, to the variable-length encoder/multiplexer P23 to be encoded (steps PS8 and PS9). The variable-length encoder/multiplexer P23 converts the received data into a bitstream and multiplexes the data based upon predetermined syntaxes and variable-length codes (step PS10). The quantized DCT coefficient is subject to dequantization and inverse DCT to obtain the locally decoded prediction error signal P18, which is added to the predicted picture P14, and the locally decoded macroblock P19 (step PS11) is obtained. The locally decoded macroblock P19 is written into the VOP memory P21 and the sprite memory P22 to be used for a later VOP prediction (step PS12).

Dominant portions of prediction including a prediction method, a motion compensation, and the update control of the sprite memory P22 and the VOP memory P21 will be discussed below in detail.

(1) Prediction Method in the VM

Normally, four different types of VOP encoding shown in FIG. 33 are processed in the VM. Each encoding type is associated with a prediction type or method marked by a circle on a macroblock basis. With an I-VOP, intra-frame coding is used singly involving no prediction. With a P-VOP, past VOP data can be used for prediction. With a B-VOP, both past and future VOP data can be used for prediction.

All the aforementioned prediction types are motion vector based. On the other hand, with a Sprite-VOP, a sprite memory can be used for prediction. The sprite is a picture space generated through a step-by-step mixing process of VOPs based upon a warping parameter set $$\vec{\alpha}=(a,b,c,d,e,f,g,h)$$

detected on a VOP basis (The mark → denotes a vector hereinafter). The warping parameter set is determined by the following parametric equations.

$$x'=(ax+by+c)/(gx+hy+1)$$

$$y'=(dx+ey+f)/(gx+hy+1)$$

The sprite is stored in the sprite memory P22.

Referring to the parametric equations, (x, y) represents the pixel position of an original VOP in a two-dimensional coordinate system. (x', y') represents a pixel position in the sprite memory corresponding to (x, y,) based upon a warping parameter. With the Sprite-VOP, the warping parameter set can be used uniformly with each macroblock to determine (x', y') in the sprite memory for prediction to generate a predicted picture. In a strict sense, the sprite includes "Dynamic Sprite" used for prediction and "Statistic Sprite" used for prediction as well as for another purpose of an approximate representation of VOP at a decoding station. In FIGS. 34 through 37 below, "sprite" stands for Dynamic Sprite.

The motion detector P8 detects the motion vector and the warping parameter to be used for the aforementioned prediction types. The motion vectors and the warping parameters are generically called the motion parameter P9 hereinafter.

(2) Motion Compensation

FIG. 34 is a diagram showing the configuration of the motion compensator P10 in detail. In the figure, a warping parameter P26, a motion vector P27, a global-motion compensator P28, a local-motion compensator P29, a warping-parameter based predicted picture candidate P30, and a motion-vector based predicted picture candidate P31 are shown. The warping-parameter and motion-vector based predicted picture candidates 30, 31 are generically called the predicted picture candidates P11 hereinafter.

FIG. 35 shows a flowchart outlining the operation of the motion compensator P10 including steps PS14 through PS21.

The motion compensator P10 generates the predicted picture candidate P11 using the warping parameter P26 of a full VOP detected on a macroblock P7 basis in the motion detector P8 or a macroblock based motion vector P27. The global-motion compensator P28 performs a motion compensation using the warping parameter P26, and the local-motion compensator P29 performs a motion compensation using the motion vector P27.

With the I-VOP, the motion compensator P10 does not operate. (The operating step proceeds to step PS21 from step PS14.) With a VOP other than the I-VOP, the local-motion compensator P29 reads out a predicted picture candidate PR1 from the locally decoded picture of a past VOP stored in the VOP memory P21 by using the motion vector P27 (step PS15). With the P-VOP, the predicted picture candidate PR1 is only available to be used.

When the B-VOP is identified in step PS16, the local-motion compensator P29 further reads out a predicted picture candidate PR2 from the locally decoded picture of a future VOP stored in the VOP memory P21 by using the motion vector P27 (step PS17). In addition, an arithmetic mean of the predicted picture candidates PR1, PR2 obtained from the past and future VOP locally decoded pictures to obtain a predicted picture candidate PR3 (step PS18).

A predicted picture candidate PR4 is generated also through Direct Prediction (step PS19). (Direct Prediction is based upon a prediction method corresponding to B-Frame in an encoding method H.263, Recommendation ITU-T. A vector for B-Frame is produced based upon a group of P-VOP vectors, which is not discussed further here in detail.) In FIG. 34, the motion-vector based predicted picture candidates P31 is a generic term for all or part of the predicted picture candidates PR1 through PR4.

If a VOP is of neither I-VOP nor B-VOP, then the VOP is of Sprite-VOP. With the Sprite-VOP, the predicted picture candidate PR1 is read out from the VOP memory based upon the motion vector. In addition, the global-motion compensator P28 reads out the predicted picture candidate P30 from the sprite memory P22 based upon the warping parameter P26 in step PS20.

The global-motion compensator P28 calculates the address of a predicted picture candidate in the sprite memory P22 based upon the warping parameter P26, and reads out the predicted picture candidate P30 from the sprite memory P22 to be outputted based upon a resultant address. The local-motion compensator P29 calculates the address of a predicted picture candidate in the VOP memory P21 based upon the motion vector P27 and reads out the predicted picture candidate P31 to be outputted based upon a resultant address.

These predicted picture candidates P11 are evaluated along with an intra-frame coding signal of the texture data P7 in the prediction mode selector P12, which selects a predicted picture candidate having the least power of a prediction error signal along with a prediction mode.

(3) Updating of Memories

The memory update unit P20 controls the VOP memory P21 and sprite memory P22 to be updated (step PS12). The contents of these memories are updated regardless of the prediction mode P13 selected on a macroblock basis.

FIG. 36 is a diagram showing the configuration of the memory update unit P20. FIG. 37 shows a flowchart including steps PS22 through PS28 illustrating the operation of the memory update unit P20.

In FIG. 36, an externally supplied VOP encoding type P32, an externally supplied sprite prediction identification flag P33 for indicating the use of the sprite memory for prediction, an externally supplied blend factor P34 used for prediction with the sprite memory, switches P35, P36, a sprite blender P37, a sprite transformer P38, a VOP memory update signal P39, and a sprite update signal P40 are shown.

Firstly, the use of the sprite with the current VO or VOL is examined if being designated by the sprite prediction identification flag P33 (step PS22). With no use of the sprite designated, the data are examined if being the B-VOP (step PS27). With the B-VOP, then no updating is performed with the VOP memory P21. With either the I-VOP or the P-VOP, then the VOP memory P21 is written over with the locally decoded macroblock P19 on a macroblock basis (step PS28).

With the use of the sprite designated in step PS22, then the VOP memory P21 is updated in the same manner as above (steps PS23, PS24), and in addition, the sprite memory PS22 is updated through the following procedure.

a) Sprite Warping (Step PS25)

In the sprite transformer P38, an area $$M(\vec{R}, t-1)$$

in the sprite memory P22 ($M(\vec{R},t-1)$ is an area having the same size as that of a VOP having the origin of the coordinates at a position in the sprite memory P22 with the VOP at a time t) is subject to warping (transformation) based upon a warping parameter $$\vec{\alpha} = (a,b,c,d,e,f,g,h).$$

b) Sprite Blending (Step PS26)

By using a resultant warped picture from a) above, a new sprite memory area is calculated in the sprite blender P37 according to the following expression, $$M(\vec{R},t) = (1-\alpha) \cdot W_b[M(\vec{R},t-1),\vec{\alpha}] + \vec{\alpha} \cdot VO(\vec{r}, \vec{t}),$$

where α is the blend factor P34, $W_b[M,\vec{\alpha}]$ is the resultant warped picture, and $VO(\vec{r},t)$ is a pixel value of a locally decoded VOP with a location $\vec{r}$ and a time t.

With a non-VOP area in a locally decoded macroblock, it is assumed that $$VO(\vec{r},t) = 0.$$

As the blend factor α is assigned on a VOP basis, a locally decoded VOP is collectively blended into the sprite memory P22 based upon a weight α, regardless of the contents of a VOP area.

According to the aforementioned prediction system in the conventional encoding system, the video object is predicted by using the memory designed to be used for detecting the motion vector alone and the memory designed to be used for detecting the warping parameter alone, both of which are structurally allowed the maximum use of a single screen alone each. Thus, the limited use of reference pictures is only available for prediction, thereby hindering a sufficient improvement in prediction efficiency.

Further, in such a system where two or more video objects are encoded concurrently, these memories only include a reference picture representing the past record of a video object to be predicted alone, which limits the variation of a reference picture and precludes the utilization of a correlation among video objects for prediction.

Further, the memories are updated regardless of such items as the internal structure, a characteristic, and the past record of the video object. This results in the insufficient storage of information lacking significant data for predicting a video object, thereby posing a problem of failing to enhance prediction efficiency.

The present invention is directed to solving the aforementioned problems. An objective of this invention is to provide the prediction system for encoding/decoding of picture data where two or more memories are provided to store the past record of the moving picture sequence effectively in consideration of the internal structure and characteristic of the moving picture sequence, thereby achieving a highly efficient prediction as well as encoding/decoding. In addition, the prediction system provides a sophisticated inter-video object prediction performing among two or more video objects.

DISCLOSURE OF THE INVENTION

According to an embodiment of the present invention, a moving picture encoder for encoding a moving picture signal is disclosed. The moving picture encoder includes a plurality of reference picture memory areas, each area storing picture data of a reference picture to be used for prediction; and a prediction picture generator including a motion compensator that generates the predicted picture by using the picture data stored in the reference picture memory area, a parameter representing a motion between an image to be predicted and the reference picture and prediction mode information indicating a prediction mode corresponding to a prediction method used for generating a predicted picture, and a memory updater that controls a timing of updating the picture data of a full frame stored in the reference picture memory area; and a multiplexer that multiplexes an information representing memory update in a bitstream.

According to a further embodiment of the present invention, a moving picture encoding method for encoding a moving picture signal is disclosed. The moving picture encoding method includes; storing a picture data of a reference picture to be used for prediction in each of a plurality of reference picture memory areas; generating a predicted picture by using the picture data stored in the reference picture memory area, a parameter representing a motion between an image to be predicted and the reference picture and prediction mode information indicating a prediction mode corresponding to a prediction method used for generating a predicted picture; controlling the storage period in which the picture data are stored in the reference picture memory area so as to update the picture data in an arbitrary period of time; and multiplexing an representing memory update in a bitstream.

BRIEF DESCRIPTION OF DRAWINGS

FIG. 33 is an exemplary diagram of VOP encoded types and corresponding prediction types.

BEST MODE FOR CARRYING OUT THE INVENTION

Embodiment 1

Figure 1:
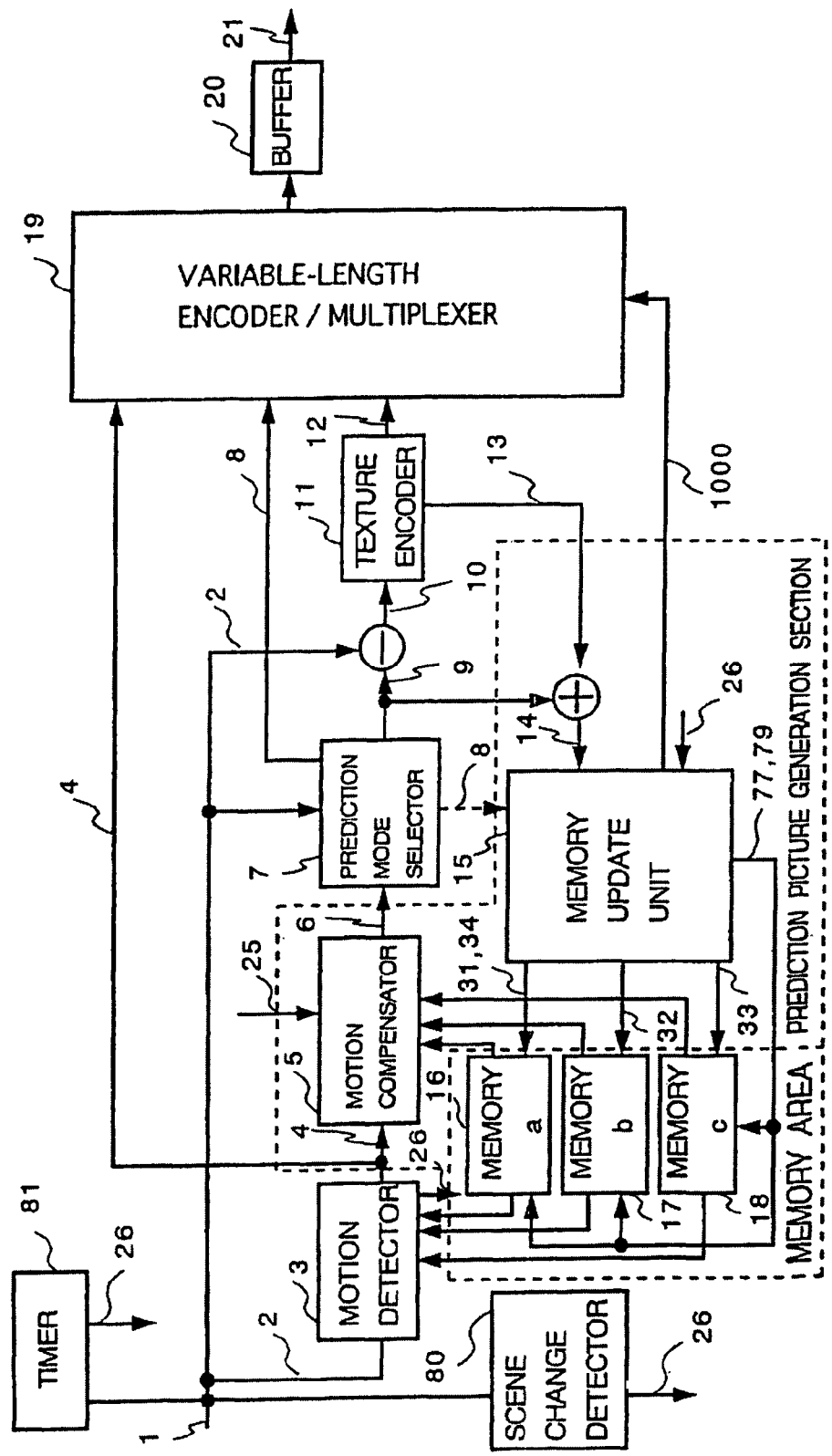
FIG. 1 is a structural diagram of a moving picture encoder according to an embodiment of this invention.
Figure 2:
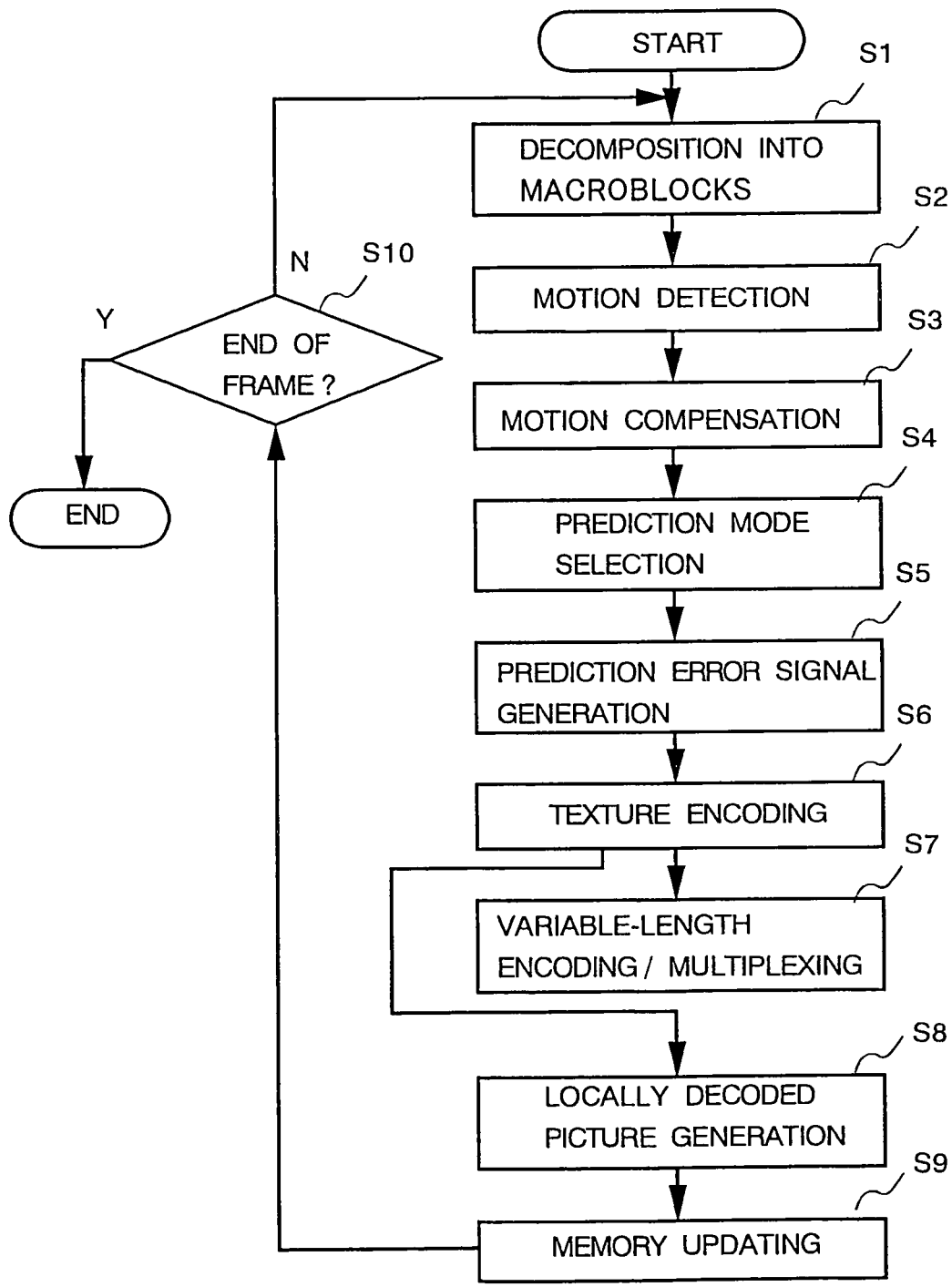
FIG. 2 is a flowchart illustrating an operation of the moving picture encoder according to the embodiment of this invention.

FIG. 1 is a block diagram showing the configuration of an encoder according to a first embodiment and the following embodiments. The diagram illustrates an input moving picture signal 1, texture data 2, a motion detector 3, a motion parameter 4, a motion compensator 5, a predicted picture candidate 6, a prediction mode selector 7, a prediction mode 8, a predicted picture 9, a prediction error picture 10, a texture encoder 11, a quantized DCT coefficient 12, a locally decoded prediction error picture 13, a locally decoded picture 14, a memory update unit 15, a memory-a 16, a memory-b 17, a memory-c 18, a variable-length encoder/multiplexer 19, a transmission buffer 20, a bitstream 21, a scene-change detector 80, and a timer 81. Particularly, the motion compensator 5 and the memory update unit 15 forms a predicted picture generation section 100 which implemented a prediction system. Memories a, b, c forms a memory area 200. In the figure, portions not mentioned in this embodiment will be discussed in the following embodiments. FIG. 2 shows a flowchart illustrating an operating flow of the encoder.

This embodiment is based upon the assumption that a plural number, e.g. three, of memories, are used adaptively according to the significance of an input moving picture based upon such characteristics of motion as an amount of motion and an intensity of color. It is also assumed that the content of an arbitrary memory (area), the memory-a for example, are updated at an arbitrary period of time and a moving picture sequence is received on a frame basis.

(1) Input Signal

As aforementioned, the encoder inputs a frame representing a picture at each time instance of the moving picture sequence and decomposes the frame into the encoding units of macroblocks which are one example of picture segments subject to prediction (step S1).

(2) Adaptive Use of Memories

The memories store previously decoded pictures or previously provided fixed pictures. In this embodiment, the three memories are used adaptively according to the significance of a picture segment in a frame as follows.

The memory-a stores a least significant picture segment (i.e., a background-like picture segment whose motion is static or flat and the texture is flat.)

The memory-b stores a less significant picture segment (i.e., a picture segment of an object whose motion is relatively small.)

The memory-c stores a most significant picture segment (i.e., a picture segment of an object whose motion is complicated or drastic.)

The least significant picture segment to be stored in the memory-a may be a background picture segment in a video conference scene or the like. The least significant picture segment also corresponds to a background segment in a camera-work relating flat motion scene of a full screen including slightly moving objects.

With this type of motion, it is efficient to obtain a frame based amount of a motion to substitute for a macroblock based motion, rather than to obtain a macroblock based amount of a motion. Specifically, a transform parameter corresponding to the sprite warping parameter discussed in the conventional art is obtained and the transform parameter of a full frame is then used as the motion parameter of a macroblock in the frame. The motion parameter may be selected from among a simple parallel translation parameter (=a motion vector), an affine motion parameter involving transformation, and a perspective motion parameter involving transformation. Here, a motion vector is one example of the motion parameter.

The less significant picture segment to be stored in the memory-b may be a picture segment of a moving figure who is not a speaker in a video conference scene or the like. This segment type of the object may be considered less attracting in the scene. The most significant picture segment to be stored in the memory-c may be a segment of an object attracting most attention in the video conference scene such as a speaker.

A picture segment stored in the memory-b or the memory-c representing a unique type of motion of an object should have a macroblock based unique motion parameter. The motion parameter of this case may be selected from among the simple parallel translation parameter (=a motion vector), the affine motion parameter involving transformation, the perspective motion parameter involving transformation, etc.

(3) Motion Detection (Step S2)

The motion detector 3 of this embodiment is designed to detect an arbitrary transform parameter of the respective three memories on a macroblock basis, involving no distinction between a motion vector and a warping parameter in the conventional art. The motion detector 3 is provided with additional functions of a global-motion parameter detection for detecting a frame based transform parameter using the memory-a and a local-motion parameter detection for detecting a macroblock based transform parameter using the memories a through c.

(4) Motion Compensation (Step S3)

Figure 3:
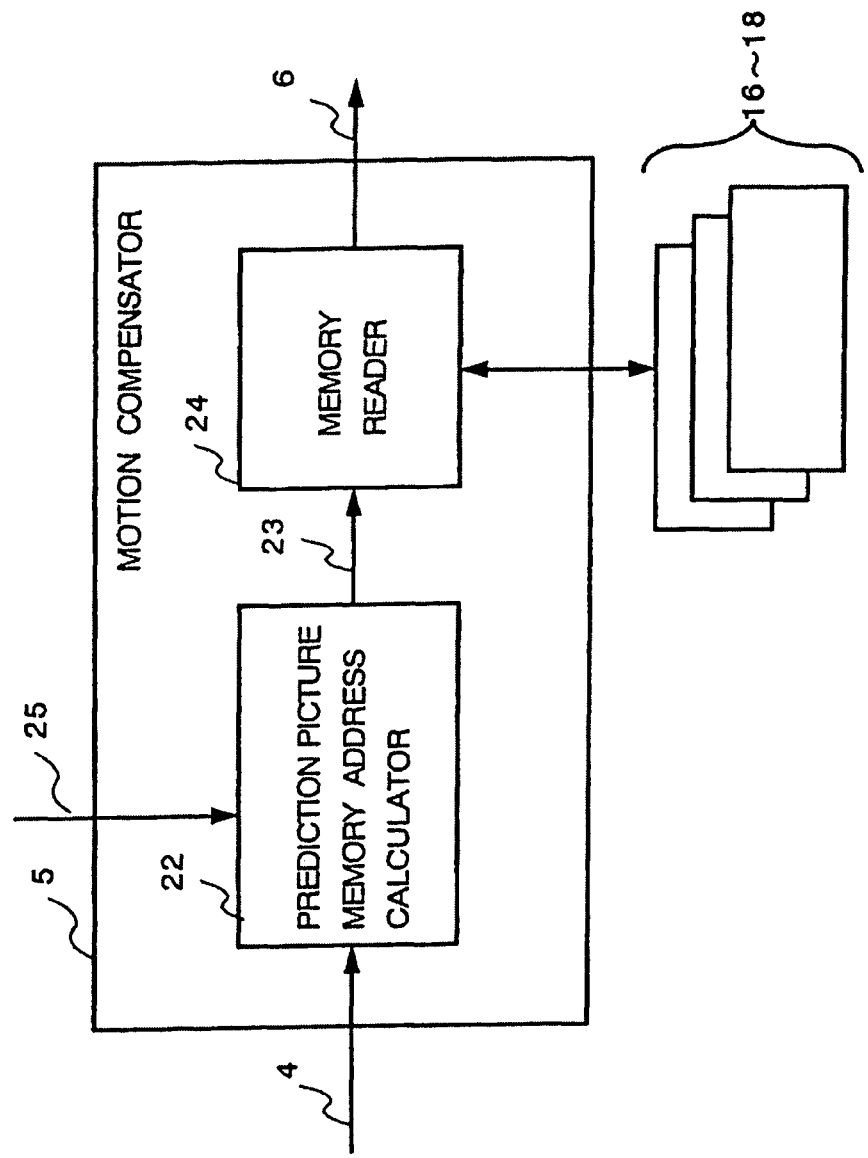
FIG. 3 is a structural diagram illustrating the configuration of a motion compensator of the moving picture encoder of the embodiment of this invention.
Figure 4:
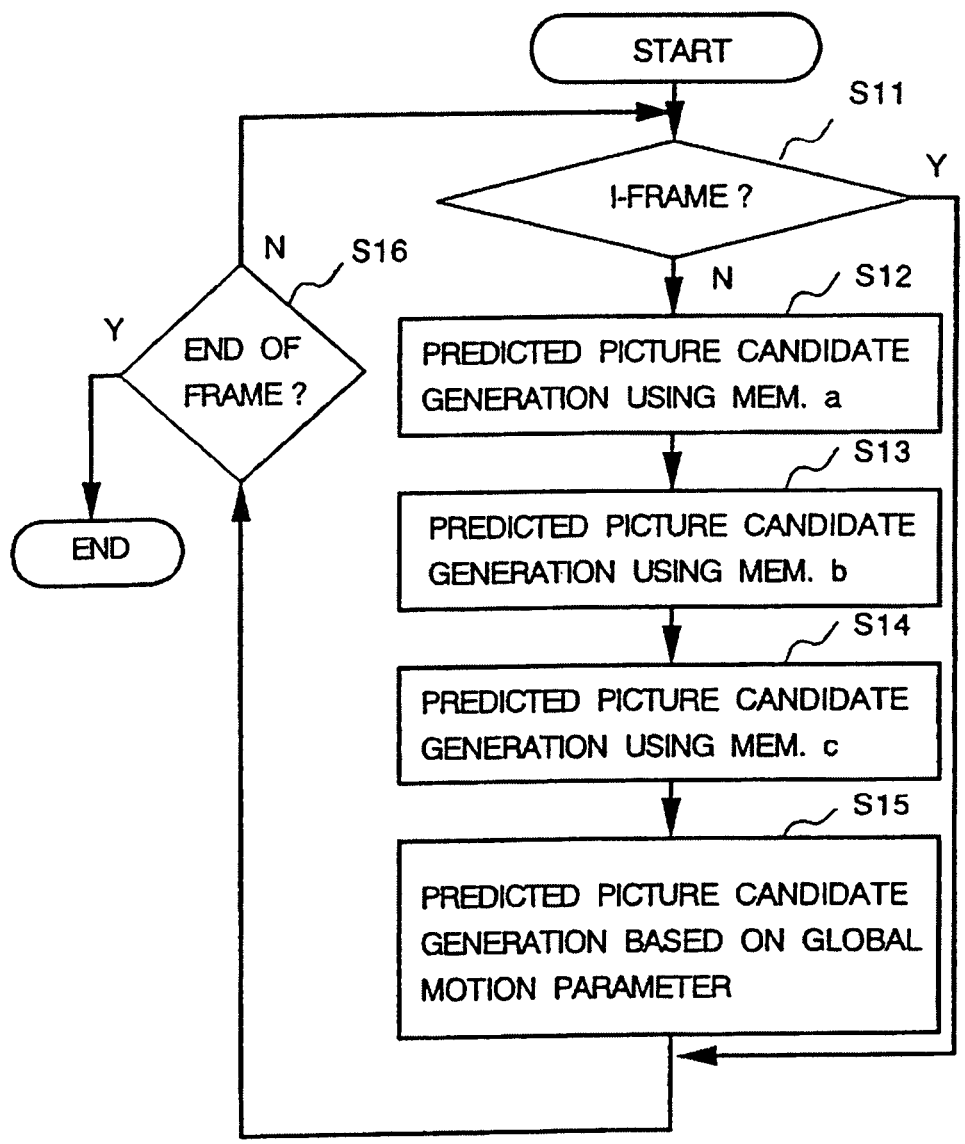
FIG. 4 is a flowchart illustrating an operation of the motion compensator.

FIG. 3 shows the configuration of the motion compensator 5 of this embodiment in detail. In the figure, a prediction picture memory address calculator 22, a prediction picture memory address 23, a memory reader 24, and a reference memory indicator signal 25 which is supplied externally are shown. In this embodiment, the reference memory indicator signal 25 indicates the use of the memory a, b, c. FIG. 4 shows a flowchart including steps S11 through S16 illustrating an operation of the motion compensator 5.

Initially, with an I(Intra)-frame, no motion compensation is performed (step S11). With a frame other than the I-frame, predicted picture candidates are generated based upon the global-motion and local-motion parameters corresponding to the respective memories detected in the motion detector 3 (steps S12 through S15). Specifically, the prediction picture memory address calculator 22 calculates the prediction picture memory address 23 of a predicted picture candidate in a memory identified by the reference memory indicator signal 25 based upon the motion parameter 4. Upon reception of the prediction picture memory address 23, the memory reader 24 reads out the predicted picture candidate 6 from a corresponding memory to be outputted.

In this embodiment, the global-motion and local-motion parameters are obtained through the same transform method, thereby allowing the motion compensator 5 of FIG. 3 to be shared by both global-motion and local-motion parameter based approaches of generating a predicted picture. When generating the predicted picture candidate 6 through the global-motion parameter, the memory-a is always used as a reference memory (step S15).

(5) Prediction Mode Selection (Step S4)

The prediction mode of this embodiment is assumed to include the following.

(a) a mode for using the memory-a,
(b) a mode for using the memory-b,
(c) a mode for using the memory-c, and
(d) a mode for using an intra-frame coding signal.

Similarly to the discussion in the conventional art, the prediction mode selector 7 selects the predicted picture candidate 6 having the least power (amplitude) of a prediction error signal, for example, from among all the predicted picture candidates 6 generated in the motion compensator 5 along with an intra-frame coding signal, and outputs a selected one of the predicted picture candidates 6 as the predicted picture 9 and an corresponding one of the prediction mode 8. The prediction mode 8 includes memory selection information indicating a memory used for predicting the selected predicted picture 9. The prediction mode 8 is transferred to the variable-length encoder/multiplexer 19 to be encoded with an allocated length of code in the bitstream 21 as prediction memory indication information 800.

(6) Memory Updating

Figure 5:
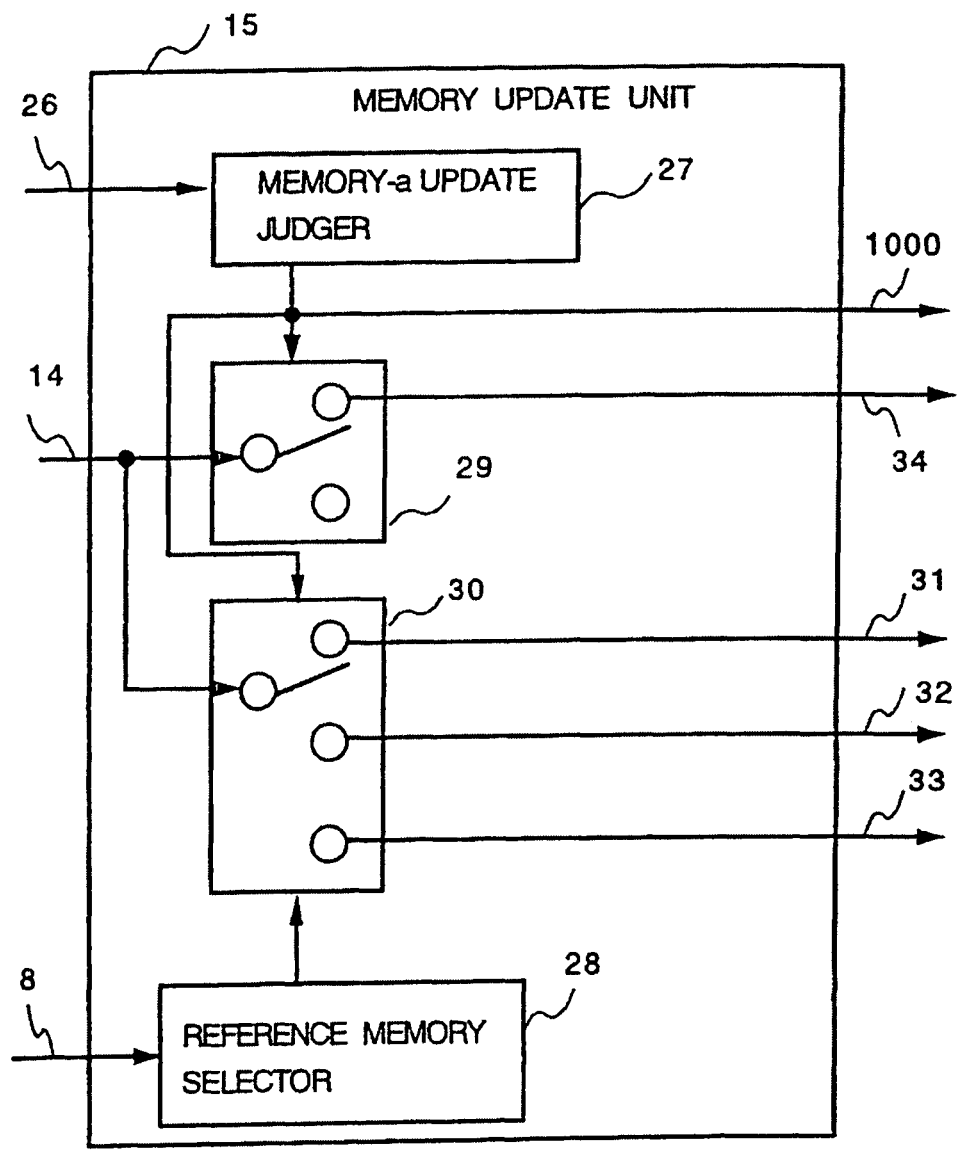
FIG. 5 is a structural diagram illustrating the structure of a memory update unit of the moving picture encoder of the embodiment of this invention.
Figure 6:
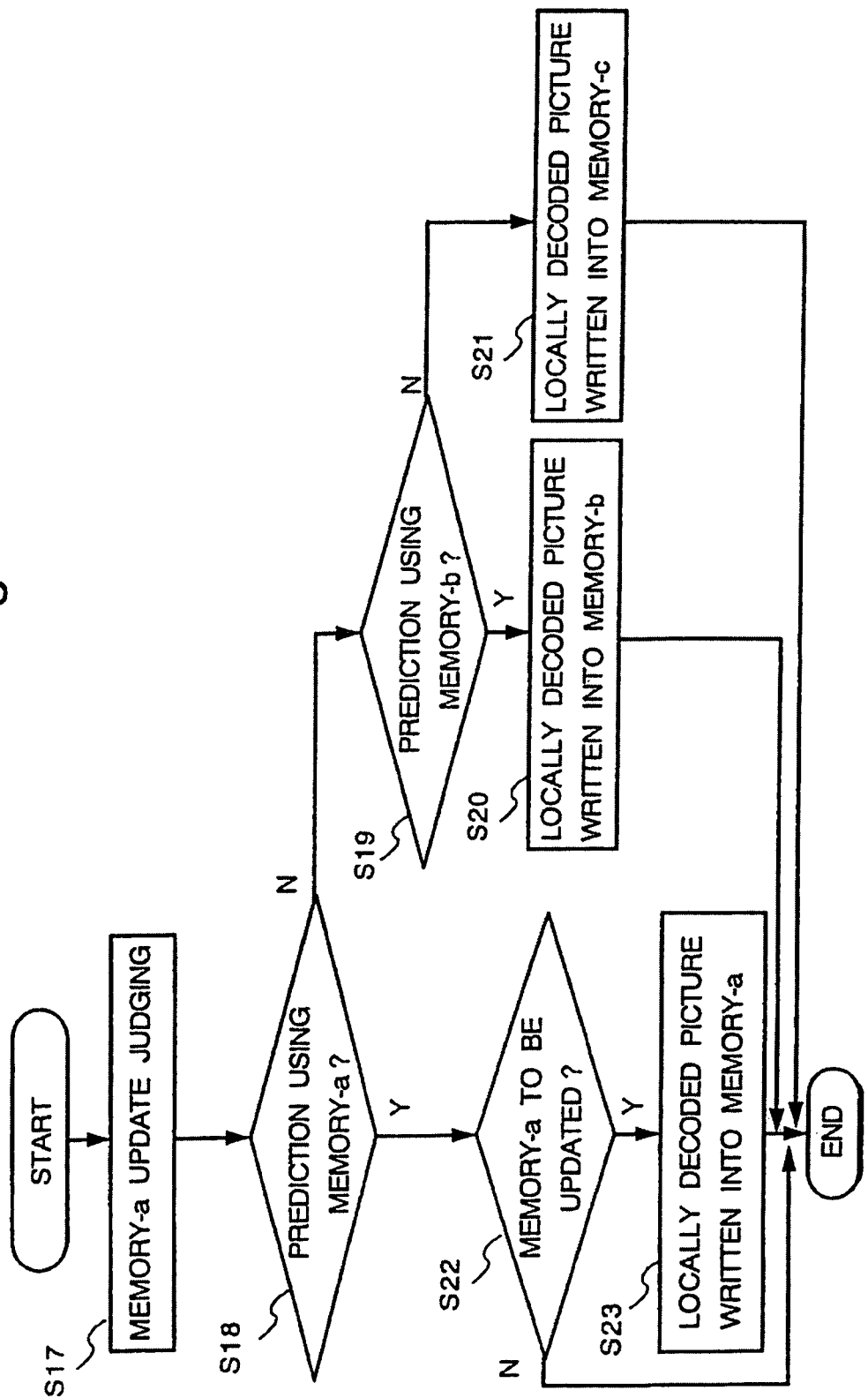
FIG. 6 is a flowchart illustrating an operation of the memory update unit.

The memory update unit 15 controls the memories to be updated. FIG. 5 shows the configuration of the memory update unit 15 of this embodiment in detail. In the figure, an activity 26 used for updating the memory-a (which will be discussed later), a memory-a update judger 27, a reference memory selector 28, switches 29, 30, picture data 31 for updating the memory-a, picture data 32 for updating the memory-b, picture data 33 for updating the memory-c, and global prediction picture data 34 for updating the memory-a are shown. FIG. 6 shows a flow of a memory updating operation.

The memory updating operation of this embodiment has the following procedure. Upon reception of the locally decoded picture 14, the memory update unit 15 judges the necessity of updating the memory-a with a frame including the locally decoded picture 14 in the memory-a update judger 27 (step S17). The reference memory selector 28 selects a memory used for predicting the locally decoded picture based upon the prediction mode 8 (steps S18, S19). Then, a reference picture stored in a selected memory is updated with one of the picture data 31, 32, 33 for updating the memory-a, the memory-b, the memory-c, respectively, and the global prediction picture data 34 for updating the memory-a of the locally decoded picture 14 based upon the following rule. A memory is assumed to be updated each frame on a prediction unit (macroblock) basis.

(1) Frame Based Regular Updating of the Memory-b and the Memory-c (Steps S20, S21):

The locally decoded picture 14 is written into either the memory-b or the memory-c used for predicting the picture.

(2) Frame Based Adaptive Updating of the Memory-a (Steps S22, S23):

The locally decoded picture 14 is written into the memory-a used for predicting the picture for an arbitrary frame only or at an arbitrary period of time based upon a memory-a update judgement 1000 obtained in step S17.

The content of memory-a is the past record of a time-unvarying picture segment such as a background picture. This removes the necessity of the regular updating of the content of memory unless a full-screen involved complicated or drastic movement such as a scene change occurs to cause a drastic change in the content of a picture segment.

As aforementioned, a frame based regular updating is performed with a complicated or drastic area of an object, whereas a longer-term based updating is performed with the content of the memory-a, thereby achieving an effective prediction with a background picture half visible among moving objects.

Viewed in this light, the memory-a is updated in an arbitrary period of time in this embodiment. Specifically, possible arbitrary update criteria are as follows.

a. A full-screen content is updated all at once with a global-motion parameter indicating a complicated or drastic motion, whereas no updating operation is performed with the parameter indicating a rather static motion.

b. A full-screen content is updated all at once on a predetermined period basis, regardless of a frame based period of time.

c. A full-screen content is updated all at once only with a frame immediately after a scene change detected.

In this embodiment, data as the arbitrary update criteria are generically called as the activity 26 used for updating memory-a. Initially, the memory-a update judger 27 judges whether to update the content of memory-a based upon the activity 26 (step S17). Specifically, the activity 26 corresponds to a value of the global-motion parameter detected in the motion detector 3 with the arbitrary update criterion-a, a time stamp of the current frame from the timer 81 with the arbitrary update criterion-b, and a flag indicating a scene change detection outputted from the scene-change detector 80 with the arbitrary update criterion-c.

When the content of memory-a is judged to be updated, the content of the locally decoded picture 14 is outputted as the global prediction picture data 34 for updating the content of the memory-a (step S23). When no updating is judged with the content of the memory-a, then no updating is performed with the memory-a.

The memory-a update judgement 1000 of a frame is multiplexed in the bitstream 21 to be transmitted to a decoding station so that the same updating of the memory-a can be performed with the frame in the decoding station.

Figure 20:
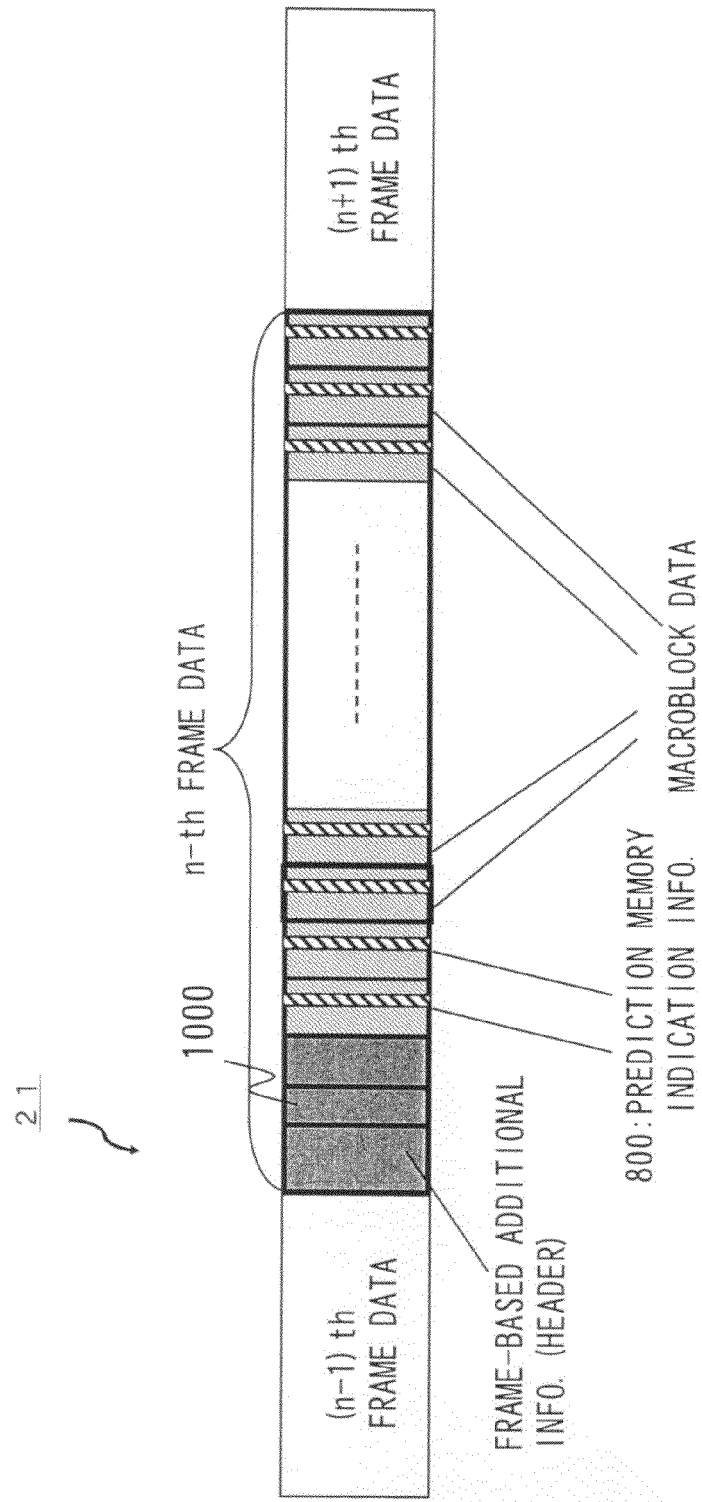
FIG. 20 is a diagram showing bit stream 21 according to the first embodiment of this invention.

FIG. 20 is a diagram illustrating the bitstream 21 of this embodiment.

FIG. 20 is a conceptual diagram showing how frame data are encoded in sequence to be transmitted. Each frame data is provided with header information at the front as a frame based additional information. The header information has the memory-a update judgement 1000 multiplexed to be transmitted to a decoding station. The header information is followed by the component macroblock data of the frame. The macroblock data include the prediction memory indication information 800 indicating a memory used for predicting the macroblock data. In a counterpart decoder, a memory for predicting a predicted picture is specified based upon the prediction memory indication information 800 of macroblock data to generate the predicted picture.

Although not shown in the figures, the memory-b update information or/and the memory-c update information may be transmitted to the decoding station along with, or alternatively to, the memory-a update judgement 1000.

The aforementioned encoder thus provides the adaptive and efficient use of two or more memories in response to the content of a moving picture sequence, thereby enhancing prediction efficiency. Specifically, a moving picture sequence is predicted based upon an arbitrary transform parameter through an adaptive use of two or more memories in response to the content and characteristic of a moving picture sequence. This enables an efficient prediction of a moving picture in response to a local characteristic of a picture by even covering complicated motion. With the enhanced prediction efficiency, the encoder is allowed to reduce an amount of encoded data without deteriorating encoded picture quality. The same prediction system may be employed by the counterpart decoder for decoding a bitstream encoded through the prediction system of this invention.

This embodiment has thus disclosed the encoder performing on a frame basis. The same effect may be expected with an alternative encoder performing on an arbitrary shaped video object (VOP) basis.

Further, this embodiment has thus disclosed the encoder performing on a macroblock basis as the macroblock being a picture segment subjected to prediction. The same effect can be expected with an alternative encoder for encoding a picture on such a picture segment basis as an arbitrary shaped picture segment and a variable shaped block including fixed-size block components.

Further, this embodiment has thus disclosed the global-motion parameter detection using the memory-a. Alternatively, a single use of the local-motion parameter detection is of course applicable involving no global-motion parameter detection. With no global-motion detection, no necessity occurs for transmitting prediction information indicating a global/local prediction as the prediction mode.

Further, this embodiment may include a special memory for prediction which stores reference picture data previously generated based upon the content of the moving picture sequence. The special memory is not updated during an encoding operation.

Further, this embodiment has thus disclosed the case that memories a, b, c store a picture segment each time and the memory update unit 15 updates one of the memories a, b, c each time. If two or all of the memories a, b, c share to store a picture in part or fully, then the memory update unit 15 updates the two or all of the memories a, b, c. In the case of the memory-a being a frame memory for storing a frame of reference picture data, the memory-b being a static sprite memory involving the adaptive updating, and the memory-c being a dynamic sprite memory involving the regular updating, the memory update unit 15 does not update the memory-b as the static sprite memory for storing previously fixed reference picture data but updates the memory-a and the memory-c concurrently when the memories store the same reference picture segment. Thus, if a duplicated storage of the reference picture data occurs with the memories a, b, c, then the memory update unit 15 updates a duplicated segment stored in each memory.

The aforementioned can also be applied to the following embodiments.

Further, this embodiment has thus disclosed the use of three memories a, b, c, but alternatively, two of the memories may be utilized.

Further, a counterpart decoder may be provided with the prediction picture generation section 100 including the same components as the motion compensator 5 and the memory update unit 15 discussed in this embodiment. A motion compensator provided in the decoder, having no necessity of generating all the three predicted picture candidates, generates a single predicted picture alone based upon a decoded motion parameter.

Embodiment 2

A second embodiment shows an encoder with a single replacement of the motion compensator 5 of the encoder shown in FIG. 1. The configuration and operation of a motion compensator 5a of the second embodiment are now described.

Figure 7:
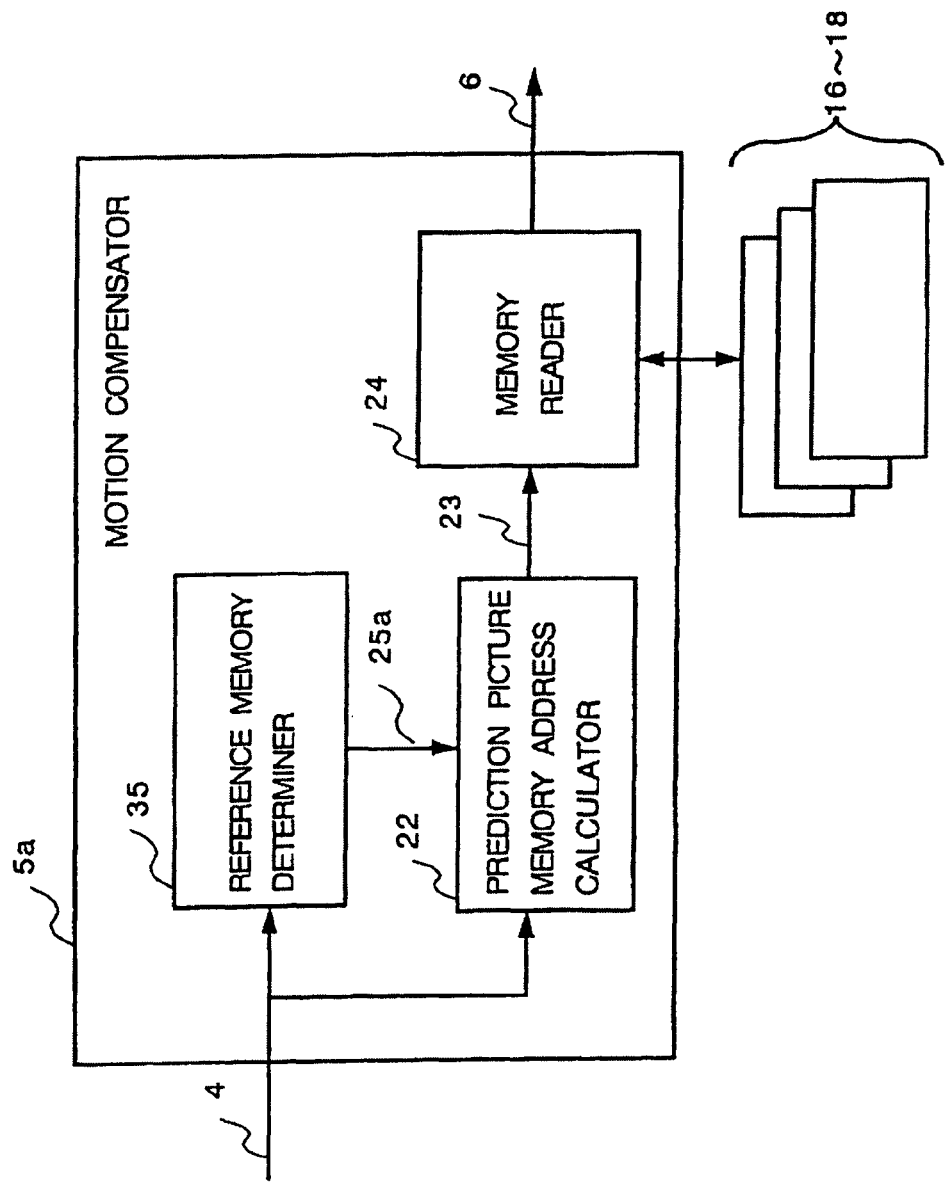
FIG. 7 is a structural diagram illustrating the configuration of a motion compensator of a moving picture encoder according to another embodiment of this invention.
Figure 8:
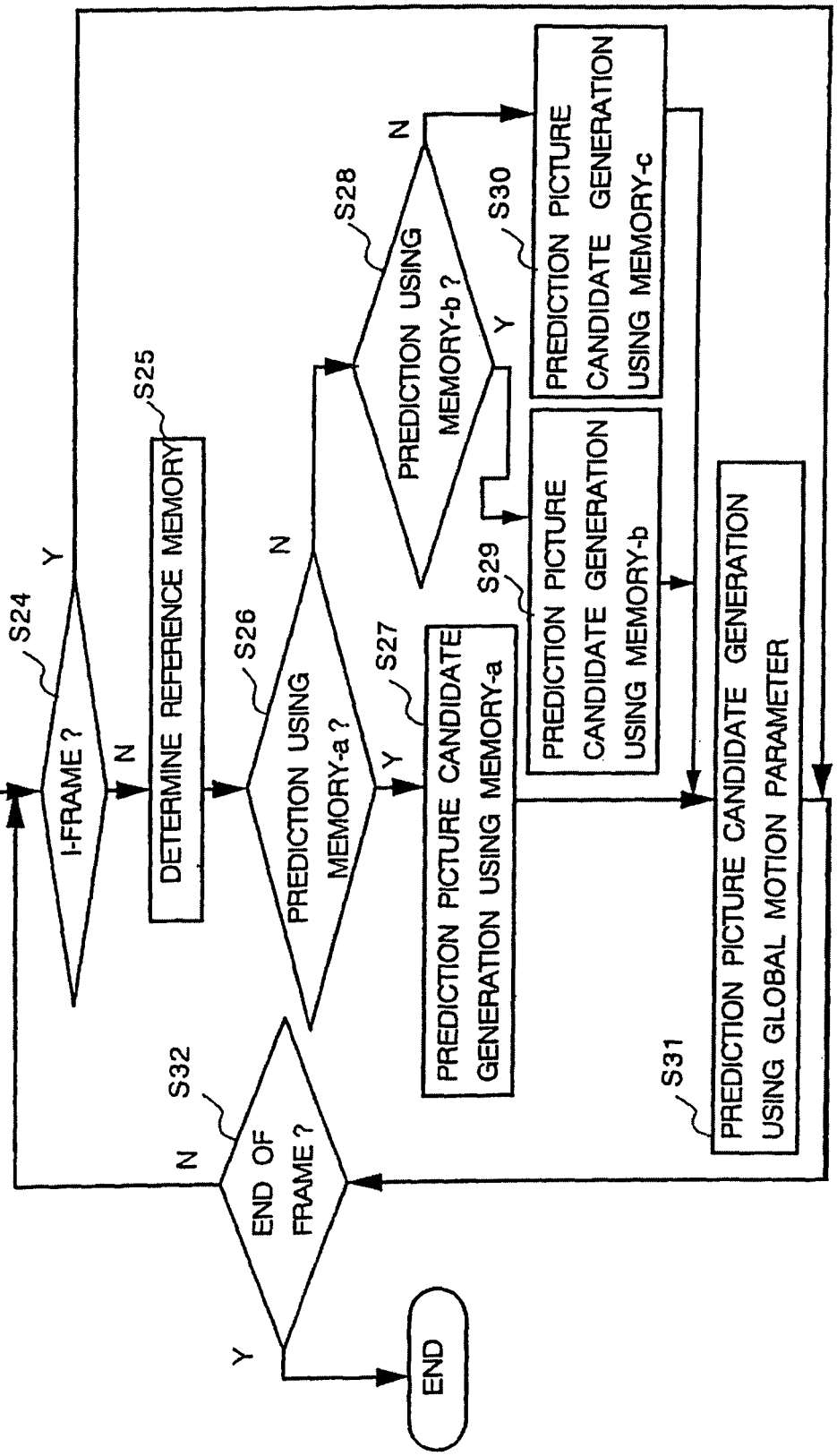
FIG. 8 is a flowchart illustrating an operation of the motion compensator of FIG. 7.

FIG. 7 shows the configuration of the motion compensator 5a of this embodiment in detail. The figure includes a reference memory determiner 35. FIG. 8 shows a flowchart illustrating a detailed operation of the motion compensator 5a.

Initially, with the I-frame, no compensation is performed (step S24). With a frame other than the I-frame, the reference memory determiner 35 determines a reference memory based upon a value of the motion parameter 4 (step S25). The reference memory determiner 35 holds effective motion parameter value ranges (which will be discussed later in detail) allocated, respectively, to the memories a, b, c. The reference memory determiner 35 compares the respective effective motion parameter value ranges with the value of the motion parameter 4 to judge which memory is designated by the motion parameter 4 and outputs a reference memory indicator signal 25a for identifying the respective memories a, b, c.

The effective motion parameter value ranges are effective search ranges allocated to the respective memories for detecting a motion vector, for example. Specifically, if ±15 pixels are assumed to be given for a total search value range, then the memory-a is chosen to be used for prediction in a range of ±0 to 3 pixels, the memory-b is used in a range of ±4 to 8 pixels, and the memory-c is used in a range of ±9 to 15 pixels, for example. Here, the reference memory determiner 35 operates only when the local-motion parameter is used for prediction, because the memory-a is exclusively used as a reference memory when the predicted picture candidate is generated based upon the global-motion parameter. This motion-vector value based approach of identifying a memory to be used for prediction is based upon the assumption that a background picture should include a static motion and a most attractive picture should include a complicated or drastic motion. This motion-vector value based approach of identifying a memory for prediction involves no necessity of encoding the prediction mode to be transmitted.

Next, the predicted picture candidate 6 is generated based upon the reference memory indicator signal 25a of a selected memory (steps S26 through S30). Specifically, the prediction picture memory address calculator 22 calculates the prediction picture memory address 23 of the predicted picture candidate 6 in an identified memory by the reference memory indicator signal 25a based upon the motion parameter 4. Based upon the prediction picture memory address 23, the memory reader 24 reads out the predicted picture candidate 6 from the memory to be outputted.

As the global-motion and local-motion parameters of this embodiment are based upon the same transform method, both parameter based approaches can share the motion compensator 5a of FIG. 7 for generating the predicted picture candidate. When reading out the predicted picture candidate 6 based upon the global-motion parameter (step S31), the memory-a is always used as a reference memory.

The effective motion parameter value ranges may be fixed on a moving picture sequence basis, and alternatively, changed on a frame basis, for example. With the frame based changes, the effective motion parameter value ranges assigned to the respective memories of the frame are multiplexed in a bitstream to be transmitted to a decoding station to perform the same memory selection.

Figure 21:
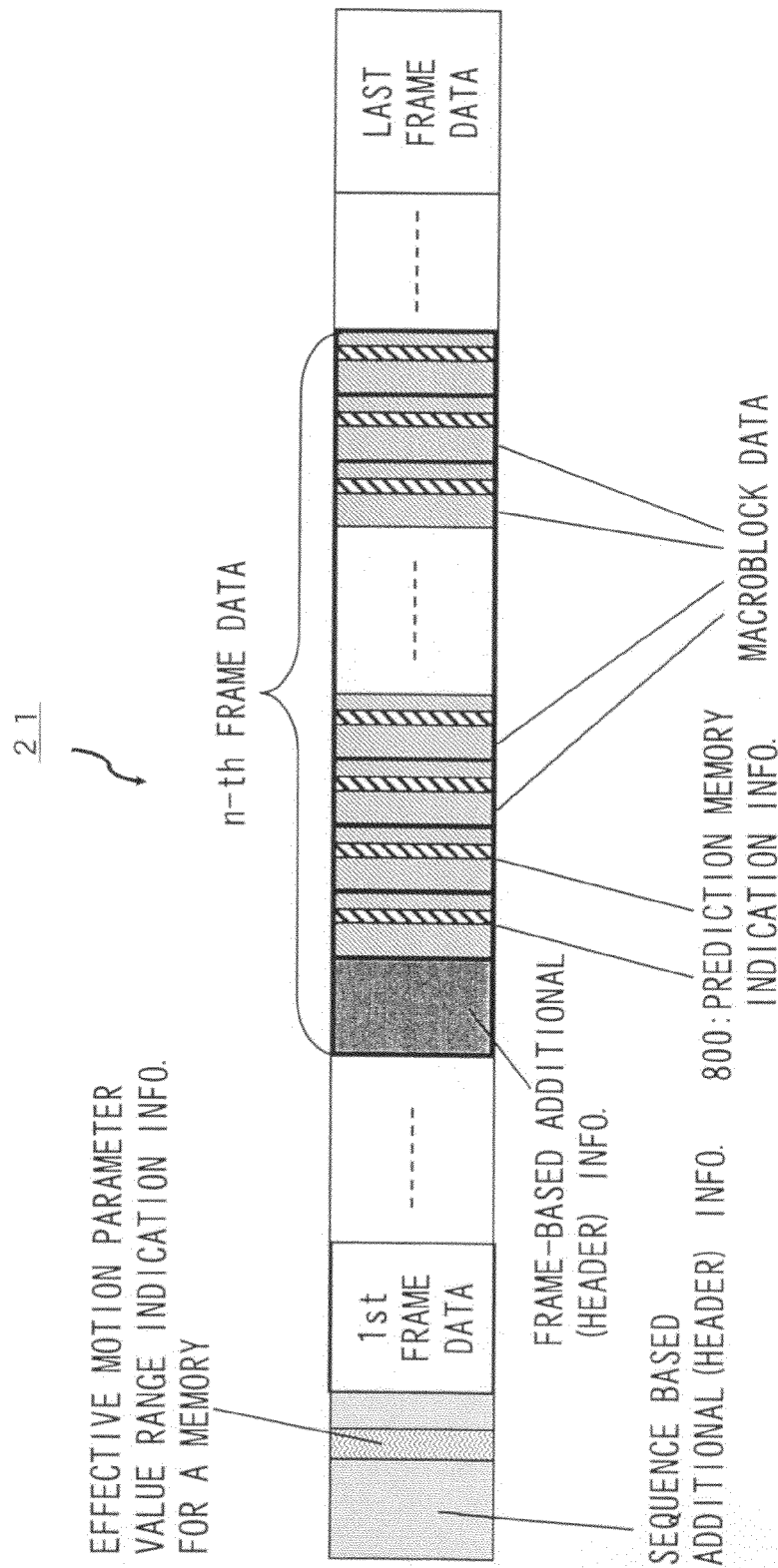
FIG. 21 is a diagram showing bit stream 21 according to the second embodiment of this invention.

FIG. 21 is a diagram showing the bitstream 21 of this embodiment.

The bitstream is provided with header information added at the front on a moving picture sequence basis. The header information includes effective motion parameter value range indication information of the respective memories. By thus designating the effective motion parameter value range indication information at the front of a moving picture sequence, the moving picture sequence is predicted with the fixed effective motion parameter value ranges in a counterpart decoder.

When varying the effective motion parameter value ranges each frame, the effective motion parameter indication information is to be included in the header information added on a frame basis.

Thus, the efficient and adaptive use of the memories in response to the magnitude of a local motion of a frame can be provided by the encoder including the motion compensator 5a, thereby enhancing prediction efficiency.

This embodiment has thus disclosed the encoder performing on a frame basis. The same effect may be expected with an alternative encoder performing on an arbitrary shaped video object (VOP) basis.

Further, this embodiment has thus disclosed the encoder performing on a macroblock basis. The same effect may be expected with an alternative encoder for encoding a picture on such a picture segment basis as an arbitrary shaped picture segment and a variable shaped block including fixed-size block components.

Further, this embodiment has thus disclosed the global-motion parameter detection using the memory-a. Alternatively, a single use of the local-motion parameter detection is of course applicable involving no global-motion parameter detection. No global-motion detection involves no necessity for transmitting information indicating a global/local prediction as the prediction mode.

Further, a counterpart decoder may be provided with the prediction picture generation section 100 including the same component as the motion compensator 5 discussed in this embodiment. In the decoder, a motion compensator only generates a single predicted picture based upon a decoded motion parameter.

Embodiment 3

Another embodiment shows an encoder having a single replacement of the motion compensator 5 of the encoder of FIG. 1. The configuration and operation of a motion compensator 5b are now described. A motion detector 3a employed in this embodiment is assumed to output an amount of the parallel translation, the affine parameter, and the perspective parameter as motion parameters 4a.

Further, the memory-a of this embodiment is assumed to be a frame memory for storing a reference picture frame, the memory-b is assumed to be a static sprite memory, and the memory-c is assumed to be a dynamic sprite memory.

Figure 9:
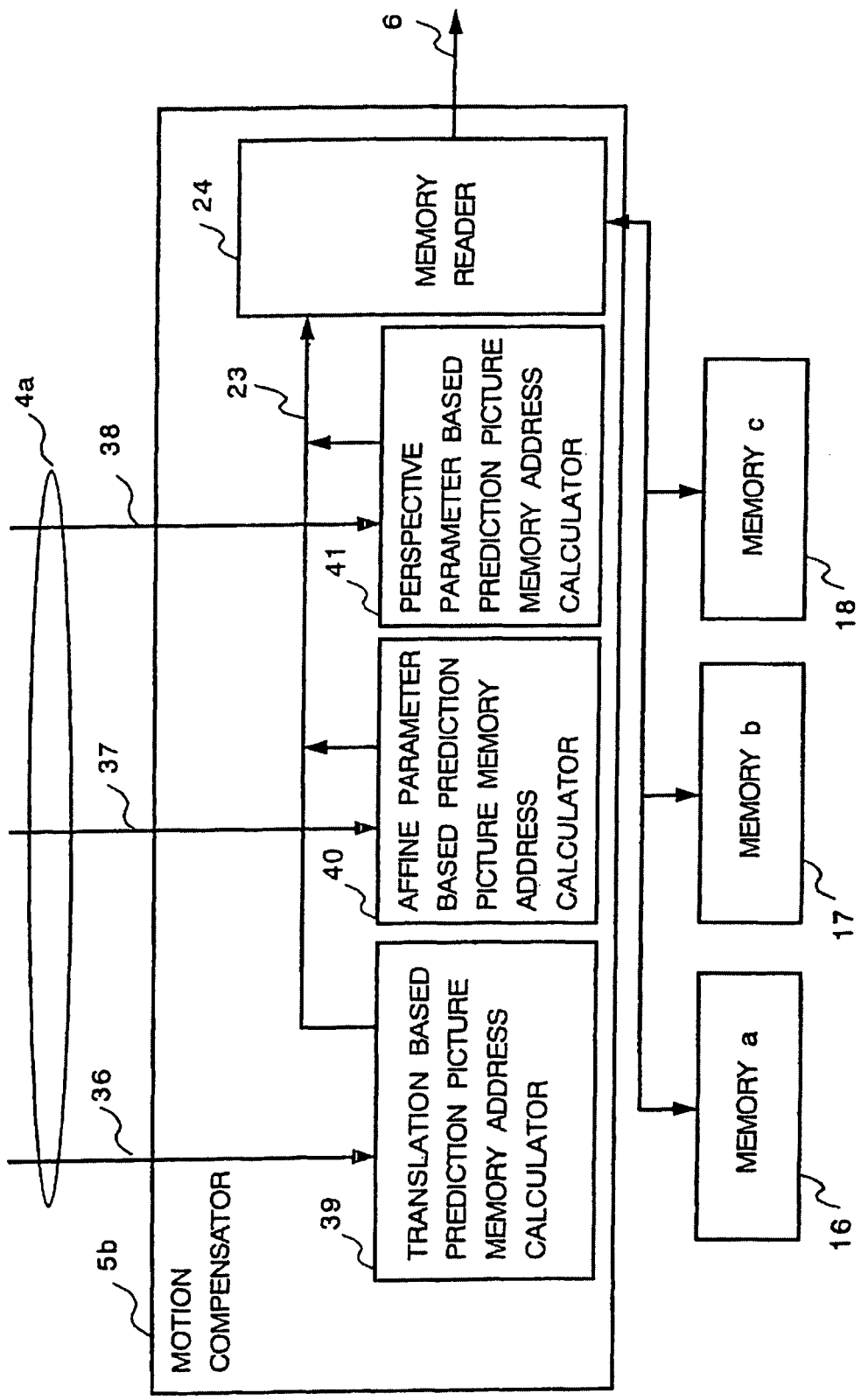
FIG. 9 is a structural diagram illustrating the configuration of a motion compensator of a moving picture encoder according to another embodiment of this invention.
Figure 10:
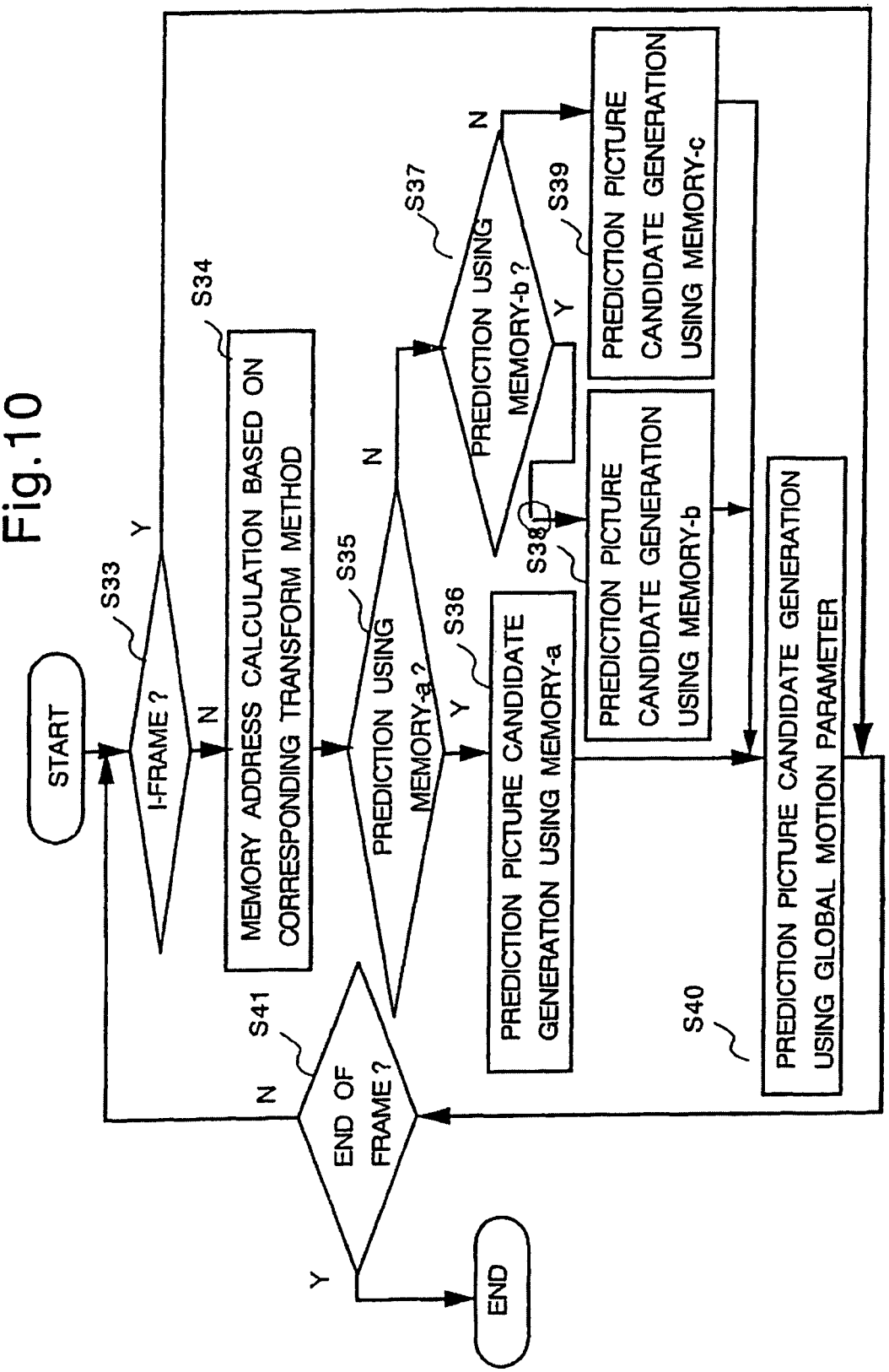
FIG. 10 is a flowchart illustrating an operation of the motion compensator of FIG. 9.

FIG. 9 shows the configuration of the motion compensator 5b of this embodiment in detail. In the figure, a parallel translation amount 36 (i.e., a motion vector), an affine parameter 37, a perspective parameter 38, a parallel-translation based prediction picture memory address calculator 39, an affine parameter based prediction picture memory address calculator 40, and a perspective parameter based prediction picture memory address calculator 41 are shown. FIG. 10 is a flowchart illustrating the operation of the motion compensator 5b in detail.

Initially, with the I-frame, no prediction is performed (step S33). With a frame other than the I-frame, the prediction picture memory address calculators 39 through 41 calculate the respective prediction picture memory addresses 23 based upon the respective values of the motion parameters 4a (step S34).

The memory address calculators 39, 40, 41 calculate addresses based upon picture transform methods assigned, respectively, to the corresponding memories. In this embodiment, the parallel translation is assigned to the memory-a, the affine parameter involving such a simple transformation as a rotation and an expansion/contraction is assigned to the memory-b, and the perspective parameter involving a three-dimensional complicated motion is assigned to the memory-c. These transform methods may be expressed by the following transform expressions.

[Parallel Translation]

Amount of parallel translation (a, b):

$$x'=x+a$$

$$y'=y+b$$

[Affine Transform]
Affine parameter (a,b,c,θ):

$$x'=a(\cos\theta)x+a(\sin\theta)y+b$$

$$y'=a(-\sin\theta)x+a(\cos\theta)y+c$$

[Perspective Transform]
Perspective parameter (a,b,c,d,e,f):

$$x'=(ax+by+c)/(gx+hy+1)$$

$$y'=(dx+ey+f)/(gx+hy+1)$$

Here, (x, y) in a two-dimensional coordinate system represents a pixel location of an original macroblock. (x', y') represents a pixel location in a memory corresponding to (x, y,) based upon each of the parameters. That is a location in a memory (x', y') is calculated based upon these parameters. Through this mechanism, a memory most suitable for the characteristic of a motion can be chosen to be used for prediction on a macroblock basis. With calculated prediction picture memory addresses 23 based upon the respective motion parameters 36, 37, 38, the memory reader 24 reads out the predicted picture candidates 6 from corresponding memories to be outputted (steps S35 through S39).

The transform methods assigned to the respective memories of the frame are multiplexed in the bitstream 21 to be transmitted to a decoding station as a motion detection method indication information so that the same motion compensation can be performed in the decoding station.

Figure 22:
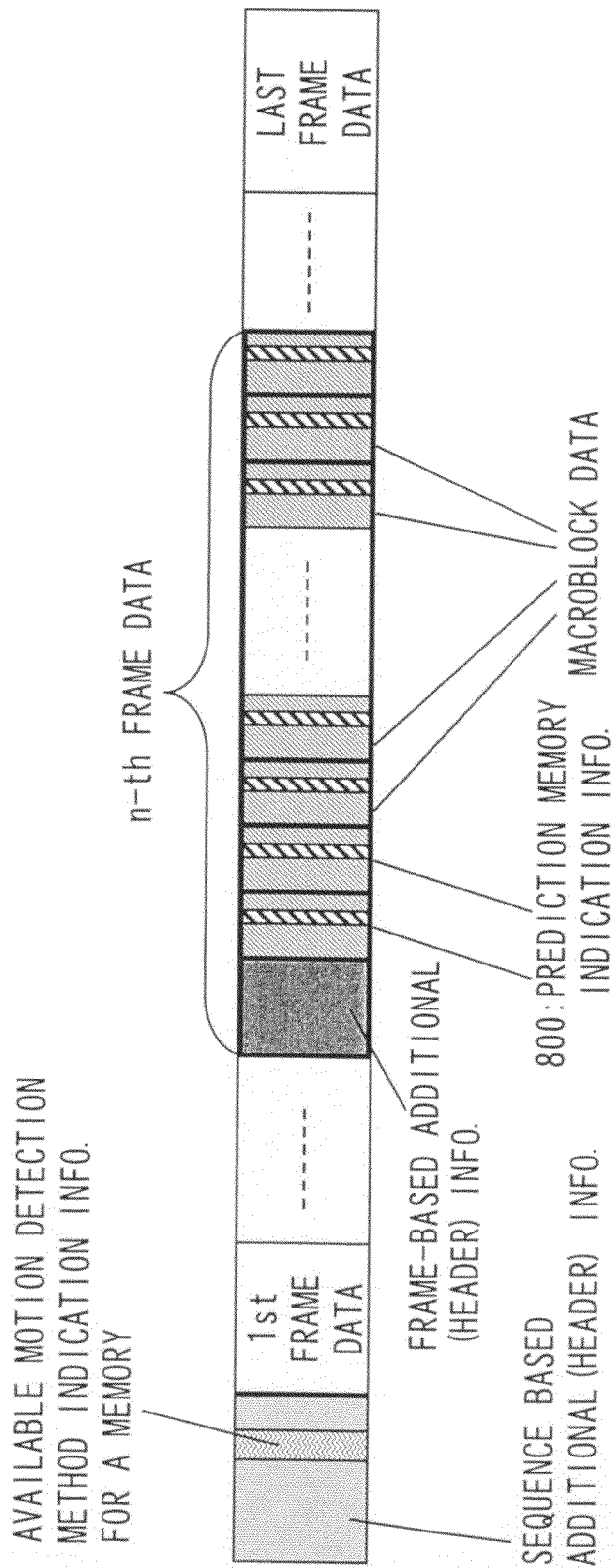
FIG. 22 is a diagram showing bit stream 21 according to the third embodiment of this invention.

FIG. 22 is a diagram showing the bitstream 21 of this embodiment.

Header information added at the front of a moving picture sequence includes the motion detection method indication information. In the encoder, the transformation types to be used in the respective memories are interchangeable, and thus the motion detection method indication information indicating a memory-transform method relation is to be transmitted to the counterpart decoder as the header information of the moving picture sequence. Thus, transformation types assigned to be used with the respective memories can be identified in the decoder.

In the decoder, the identified transformation types are dynamically assigned to the respective memories.

Thus, the efficient and adaptive use of the memories in response to the characteristic of a local motion of a frame is provided by the encoder including the motion compensator 5b, thereby enhancing prediction efficiency.

This embodiment has thus disclosed the encoder performing on a frame basis. The same effect may be expected with an alternative encoder performing on an arbitrary shaped video object (VOP) basis.

Further, this embodiment has thus disclosed the encoder performing on a macroblock basis. The same effect may be expected with an alternative encoder for encoding a picture on such a picture segment basis as an arbitrary shaped picture segment and a variable shaped block including fixed-size block components.

Further, this embodiment has thus disclosed the global-motion parameter detection using the memory-a. Alternatively, a single use of the local-motion parameter detection is of course applicable involving no global-motion parameter detection. No global-motion detection involves no necessity of transmitting information of a global/local prediction as the prediction mode.

Further, this embodiment has thus disclosed the use of the memories a, b, and c. Alternatively, the use of memories a and b alone, memories a and c alone, or memories b and c alone, is also applicable.

Further, a decoder may be provided with the prediction picture generating section 100 including the same component as the motion compensator 5b discussed in this embodiment. A motion compensator in a decoder only generates a single predicted picture based upon a decoded motion parameter.

Embodiment 4

Figure 11:
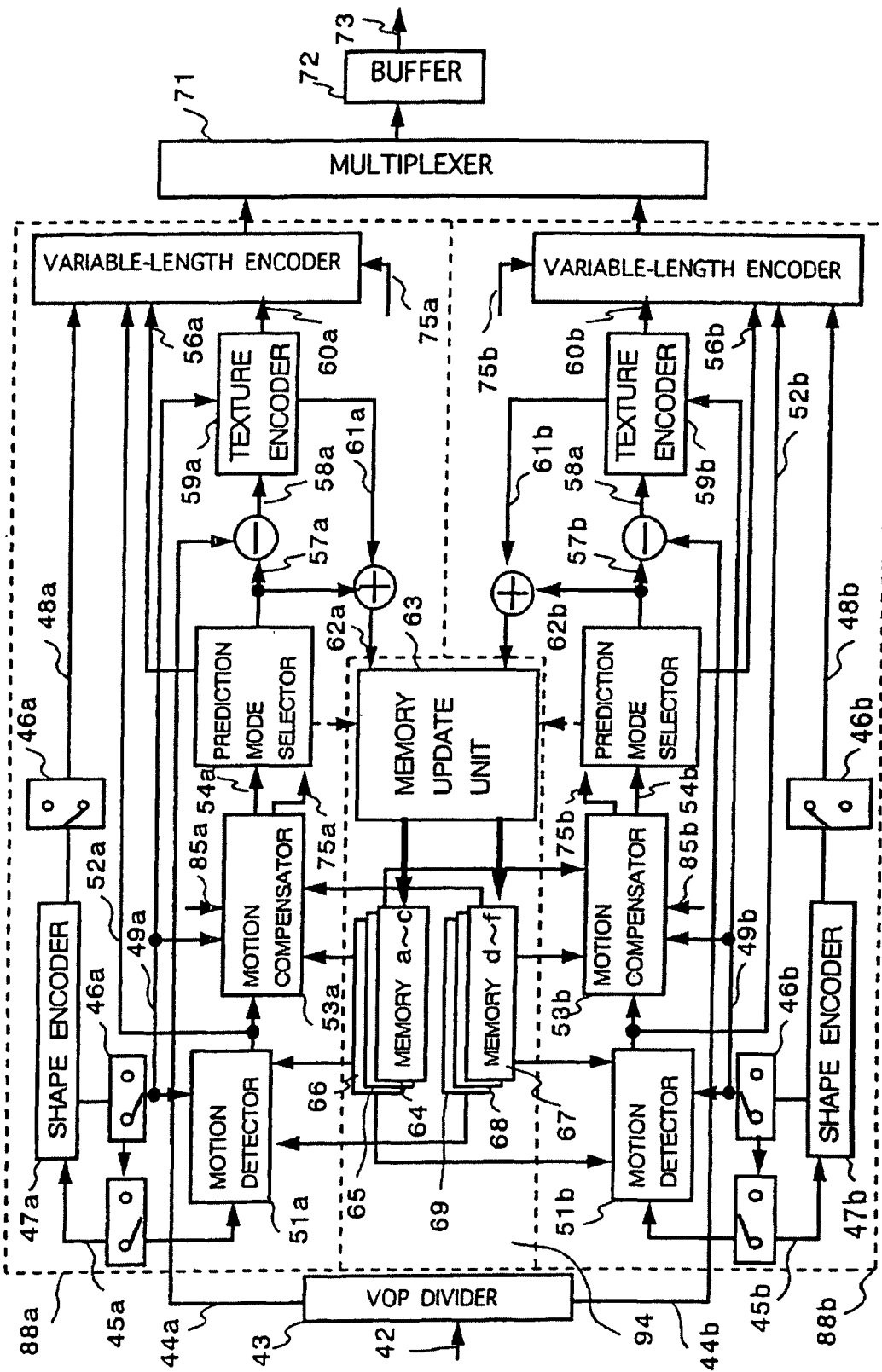
FIG. 11 is a structural diagram of a moving picture encoder according to another embodiment of this invention.

Another embodiment shows an encoder which receives a plural number, two for example, of different video objects, having shape information, intermingled in a moving picture sequence for a collective encoding. FIG. 11 shows the configuration of the encoder of this embodiment.

In the figure, an input picture frame 42, an object separator 43, object data 44a, 44b, shape blocks 45a, 45b, switches 46a, 46b, shape encoders 47a, 47b, compressed shape block data 48a, 48b, locally decoded shape blocks 49a, 49b, texture data (macroblocks) 50a, 50b, motion detectors 51a, 51b, motion parameters 52a, 52b, motion compensators 53a, 53b, predicted picture candidates 54a, 54b, prediction mode selectors 55a, 55b, prediction mode information 56a, 56b, predicted pictures 57a, 57b, prediction error signals 58a, 58b, texture encoders 59a, 59b, compressed texture data 60a, 60b, locally decoded prediction error signals 61a, 61b, locally decoded macroblocks 62a, 62b, a memory update unit 63, memory-a 64, memory-b 65, memory-c 66, memory-d 67, memory-e 68, memory-f 69, variable-length encoders 70a, 70b, a multiplexer 71, a buffer 72, a bitstream 73, a memory section 94, an object-A encoder 88a for encoding an object-A, and an object-B encoder 88b for encoding an object-B are shown. The object encoders 88a, 88b are structurally identical to each other with the identical components.

This encoder inputs the picture frame 42, which is decomposed into the encoding units of objects in the object separator 43. The object separator 43 is assumed to be assigned a processing method arbitrarily.

The shape information of an object is transferred to the shape encoder 47a, 47b in a form of the shape block 45a, 45b to be encoded, and then transferred to the variable-length encoder 70a, 70b as the compressed shape block data 48a, 48b.

The motion detector 51a, 51b detects a motion parameter based upon the locally decoded shape block 49a, 49b in the same manner as that of the VM encoding system. A motion parameter can be detected on a macroblock basis by using all the memories a through f.

As a rule, however, the memories a through c are designed to be used for an object-A to be encoded in the object-A encoder 88a, and the memories d through f are designed to be used for an object-B to be encoded in the object-B encoder 88b.

Also, as for a motion type, an arbitrary transform parameter is assumed to be detected on a macroblock basis with all the memories in the memory section 94, involving no distinction between the motion vector and the warping parameter.

The motion compensator 53a, 53b generates all the predicted picture candidates 54a, 54b based upon the respective motion parameters 52a, 52b. Then, in the prediction mode selector 55a, 55b, the predicted picture 57a, 57b is obtained along with the prediction mode information 56a, 56b. The predicted picture 57a, 57b is then differentiated from an original signal or the texture data 50a, 50b to obtain the prediction error signal 58a, 58b, which is encoded in the texture encoder 59a, 59b to be transmitted to the variable-length encoder 70a, 70b. The locally decoded prediction error signal 61a, 61b is added to the predicted picture 57a, 57b to obtain the locally decoded macroblock 62a, 62b to be stored into the memories a through f in accordance with an indication by the memory update unit.

Object A/B data when encoded in the object-A/B encoder 88a, 88b are multiplexed in the bitstream 73 at the multiplexer 71 to be transmitted via the buffer 72.

The prediction of this embodiment is discussed below focusing on the motion compensator 53a, 53b playing a primary role in the prediction.

Figure 12:
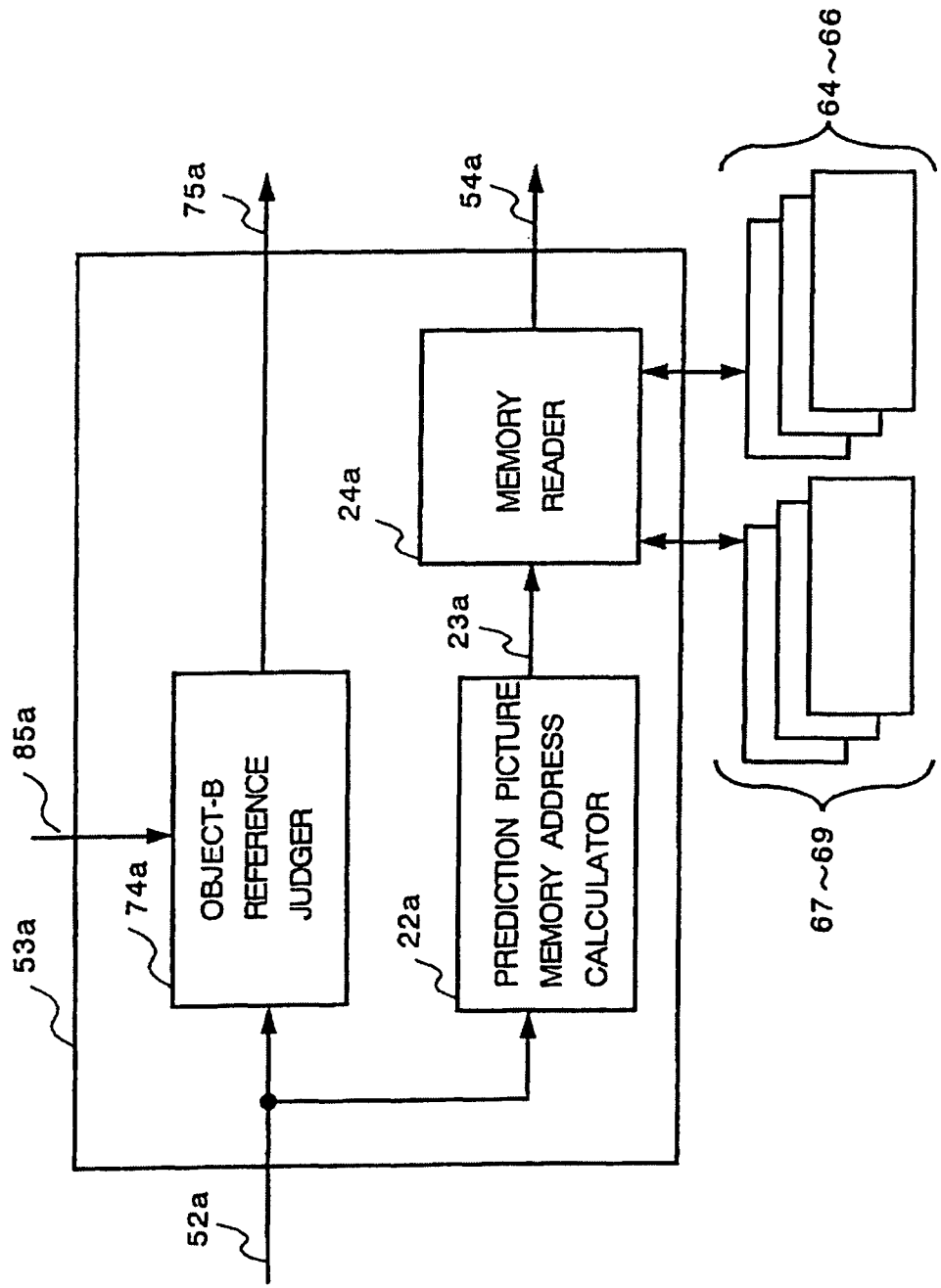
FIG. 12 is a structural diagram showing the configuration of a motion compensator of the moving picture encoder according to the embodiment of this invention.
Figure 13:
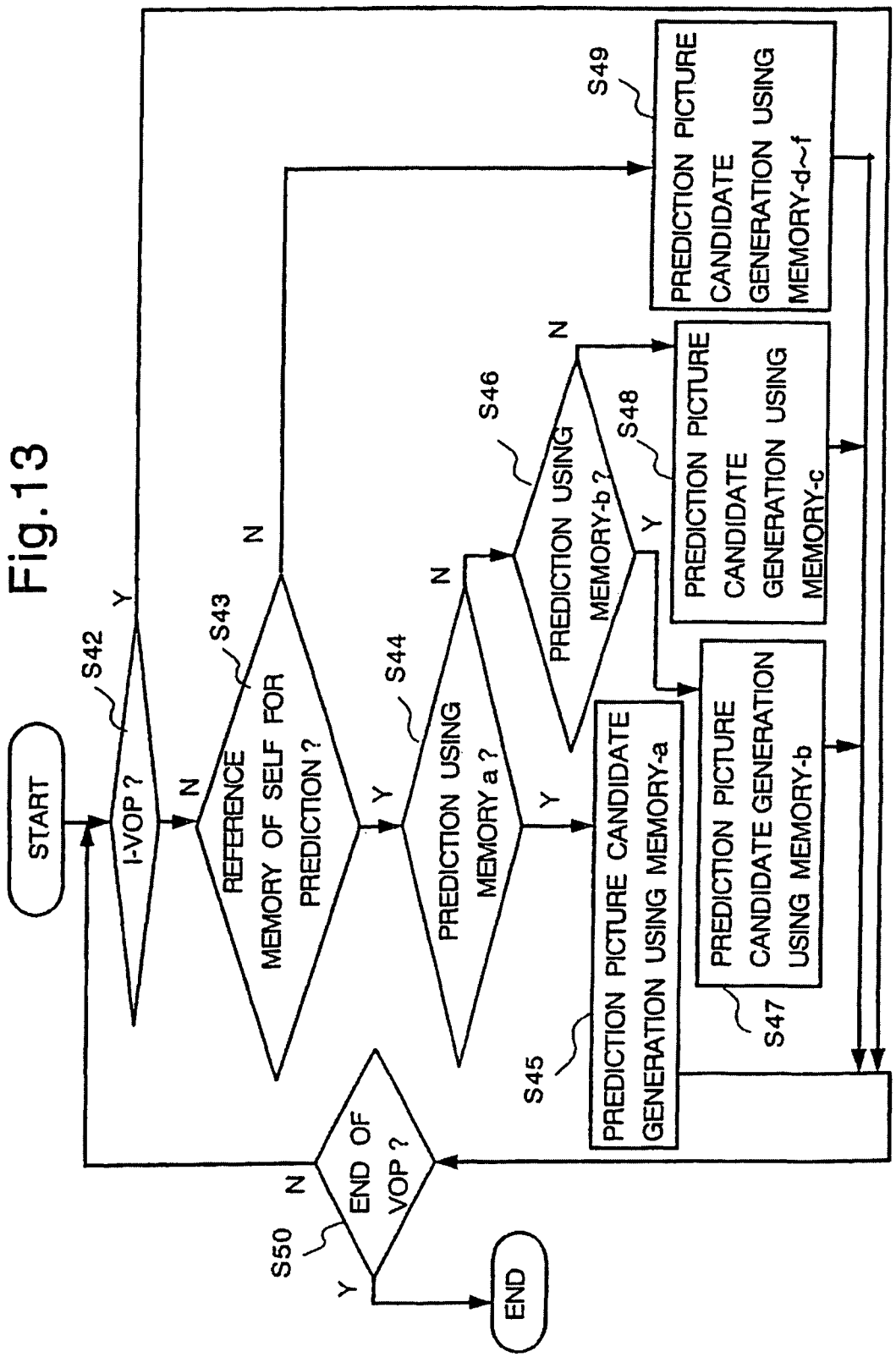
FIG. 13 is a flowchart illustrating an operation of the motion compensator of FIG. 12.

The motion compensator 53a, 53b of this embodiment generates a predicted picture candidate based upon the motion parameter 52a, 52b detected in the motion detector 51a, 51b. FIG. 12 shows the configuration of the motion compensator 53a in detail. FIG. 13 shows a flowchart illustrating the operation of the motion compensator 53a in the object-A encoder 88a.

In FIG. 12, an object-B reference judger 74a and an object-B reference indicator flag 75a are shown.

The motion parameter 52a includes memory information used for detection. A predicted picture candidate is generated based upon a parameter value through the prediction picture memory address calculator 22a and a memory reader 24a in the same manner as that stated in the first embodiment (step S44 through step S49). The object-B reference judger 74a judges if the memories assigned to object-B are used for predicting the current macroblock based upon the reference memory information included in the motion parameter 52a (step S43).

The object-B reference judger 74a outputs a judged result as the object-B reference indicator flag 75a, which is multiplexed in the bitstream 73 to be transmitted to a decoding station so as to be used for deciding whether the object can be reproduced in a single use of the memories a, b, c of self in the decoding station. In order to secure the single use of the memories of self when reproducing the object in the decoding station, a limited use of the memories (a, b, c alone) of self for prediction can be controlled by an externally supplied signal 85a at the time of encoding the object.

Thus, the efficient and adaptive use of the memories in response to the characteristic of a local motion of a frame is provided by the encoder including the motion compensator 53a, 53b, thereby achieving an efficient prediction.

This embodiment has thus disclosed the encoder for encoding an object on a macroblock basis. The same effect may be expected with an alternative encoder for encoding a picture on such a picture segment basis as an arbitrary shaped picture segment and a variable shaped block including fixed-size block components.

Further, a decoder may be provided with the same components as the motion compensator 53a, 53b of this embodiment. A motion compensator 53 of the decoder only generates a single predicted picture based upon a decoded motion parameter. Further, if the decoder is structured so as to acknowledge whether a decoding object can be reproduced by itself by way of decoding a bit corresponding to object reference indicator flag 75a, 75b of the other object in a bitstream, then an error-free secured reproduction of decoded object data can be achieved.

Embodiment 5

Another embodiment shows an encoder where the number of memories or the size of a memory can be varied flexibly in response to a change in a video object at each time instance. The encoder of a fifth embodiment modifies the encoder of FIG. 1 with a replacement of the memory update unit 15.

Figure 14:
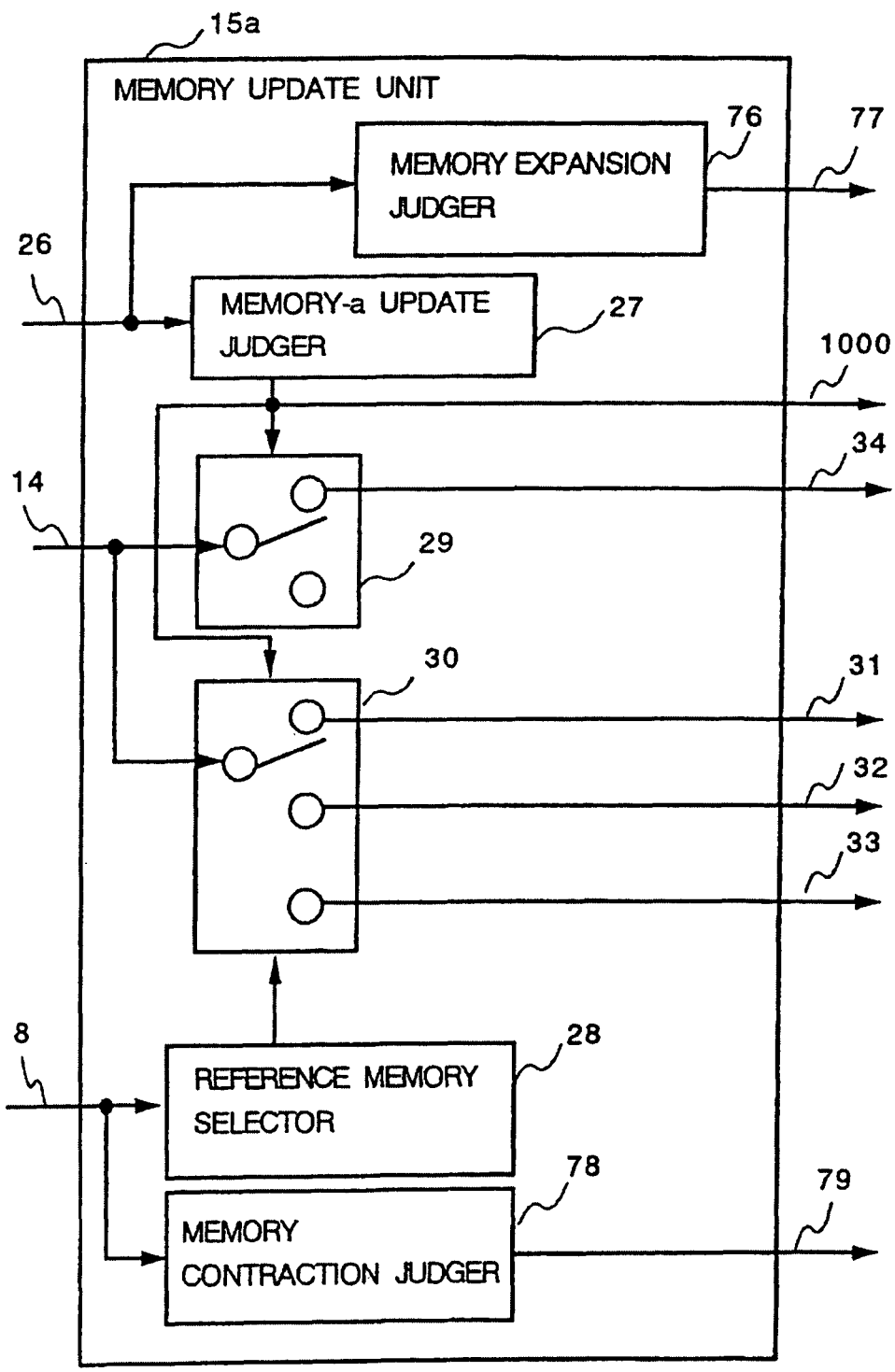
FIG. 14 is a structural diagram illustrating the configuration of a memory update unit of a moving picture encoder according to another embodiment of this invention.
Figure 15:
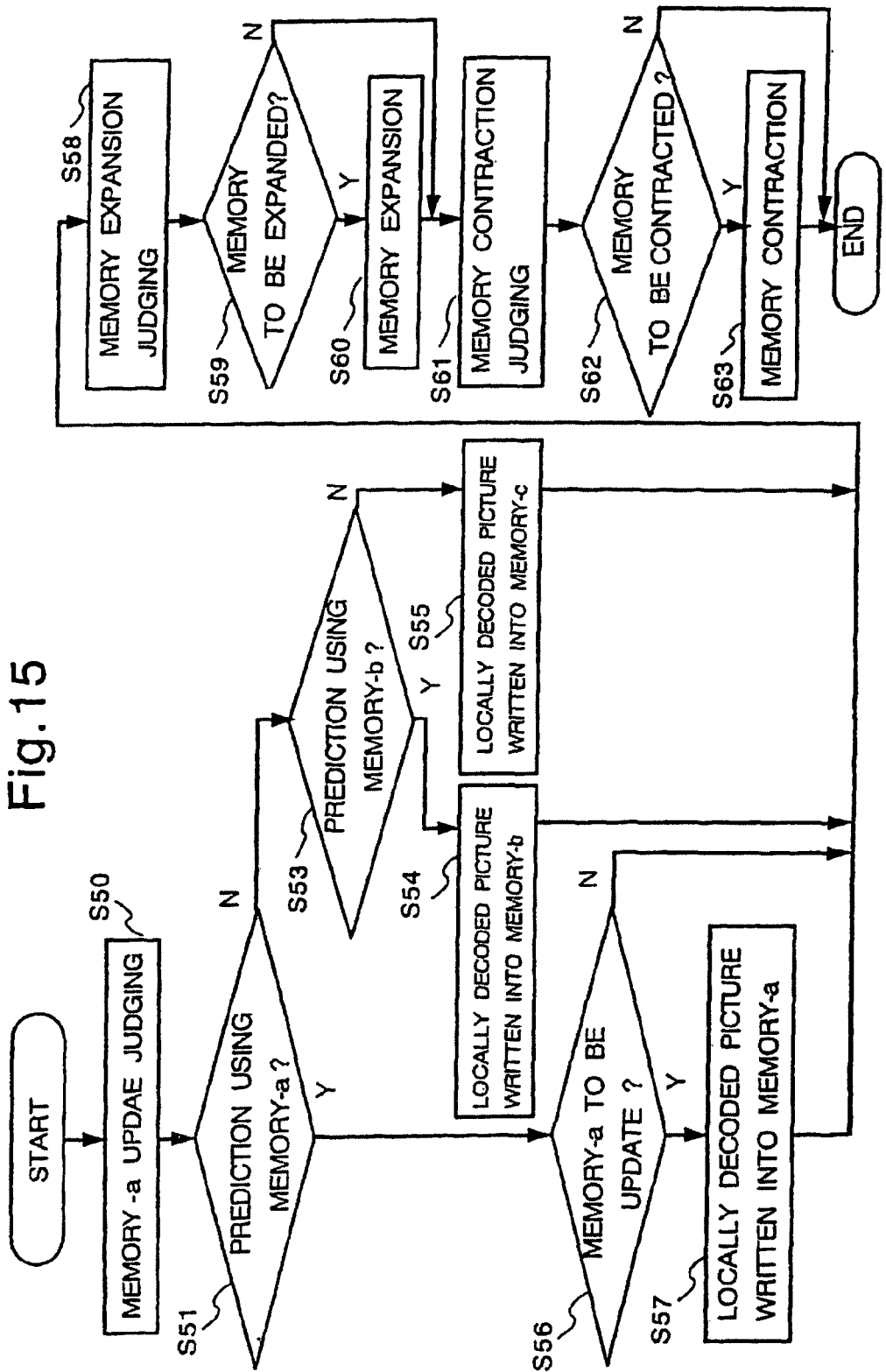
FIG. 15 is a flowchart illustrating an operation of the memory update unit of FIG. 14.

FIG. 14 shows the configuration of a memory update unit 15a of this embodiment in detail. In the figure, a memory expansion judger 76, a memory expansion indicator signal 77, and a memory contraction judger 78, and a memory contraction indicator signal 79 are shown. FIG. 15 shows an operating flow (step S51 through S63) of the memory update unit 15a.

A picture substantially different from the past record of a moving picture sequence stored in the memories may occur due to a scene change or the like. This may cause a deterioration of prediction efficiency after the scene change if reference pictures stored in the existing memories are the only available. For such an occasion, the scene-change detector 80 detects a scene change, a frame appearing immediately after the detected scene change is subject to intra-frame coding or the like, and resultant intra-frame coded data are stored additionally in a memory as new reference data, thereby enhancing prediction efficiency thereafter.

Further, in consideration of the physical limitation of storage capacity, a flexible approach of contracting the portions which are rarely used for prediction of the reference pictures stored in the memories is introduced. Specifically, the frequency in use of memory areas for prediction of the respective memories a, b, c is examined in the memory update unit 15a based upon the prediction mode 8. Consequently, the memory update unit releases a memory area identified low in frequency from an area for use. For example, with a software based implementation of this encoder, limited RAM resources may be used effectively.

Viewed in this light, the memory update unit 15a of this embodiment is provided with a function of expanding a memory area in response to each time instance of a time-varying moving picture sequence and contracting a memory area including a reference picture rarely used for prediction.

The memory-a, similarly to the first embodiment, is judged in the memory-a update judger 27 whether to be updated (step S50). When updating the memory-a, the locally decoded picture 14 is written into the memory-a (steps S56, S57). The locally decoded picture 14 is written into the other memories as well in accordance with the prediction mode 8 (step S51 through S55).

The updating of the contents of the memories involves the judgement of memory expansion/contraction. The memory expansion judger 76 judges whether to expand the size of the memory-a (or the memory-b, or the memory-c) based upon the activity 26 used for updating the memory-a (steps S58 through S60). When a positive judgement is made due to a scene change or the like, the expansion of the memory is indicated by the memory expansion indicator signal 77. The memory contraction judger 78 counts the times of a memory area used for prediction based upon the prediction mode 8. With a memory area counted less than a predetermined number in use for prediction, the contraction of the memory area is indicated by the memory contraction indicator signal 79 (steps S61 through S63).

Thus, a highly efficient prediction can be achieved in response to each time instance of a time-varying moving picture sequence by the encoder including the memory update unit 15a. In addition, the dynamic allocation of memory areas required for prediction contributes to the enhancement of prediction efficiency and the effective use of memory resources.

This embodiment has thus disclosed the encoder performing on a frame basis. The same effect may be expected with an alternative encoder performing on an arbitrary shaped video object (VOP) basis.

Further, this embodiment has thus disclosed the encoder for encoding a frame on a macroblock basis. The same effect can be expected with an alternative encoder for encoding a picture on such a picture segment basis as an arbitrary shaped picture segment and a variable shaped block including fixed-size block components.

Further, a counterpart decoder may be provided with the same component as the memory update unit 15a discussed in this embodiment.

Embodiment 6

With reference to the respective previous embodiments, the memories to be used for prediction are changed on a macroblock basis. Alternatively, the memories to be used for prediction can be changed on a frame or a video object basis. This eliminates the necessity of encoding memory relating information to be encoded on a frame or a video object basis and memory selection information (which is included in the prediction mode 8) to be encoded on a macroblock basis, thereby achieving an efficient encoding.

Figure 23:
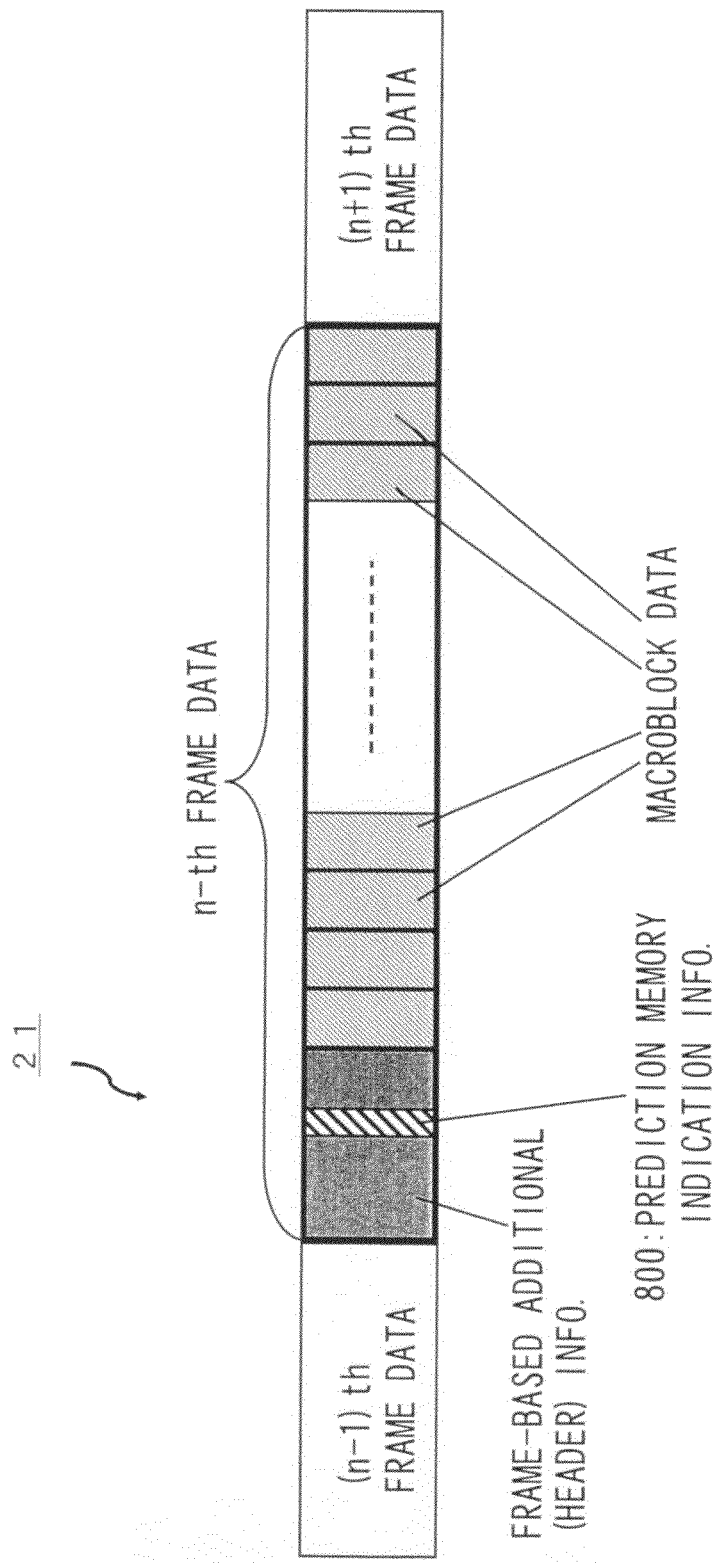
FIG. 23 is a diagram showing bit stream 21 according to the sixth embodiment of this invention.

With reference to the encoder of FIG. 1 of the first embodiment, for example, the macroblock based changes of the memories used for prediction create the necessity of transmitting additional information identifying a memory used for prediction on a macroblock basis. According to this embodiment, the changing unit of the memories to be used for prediction is limited to a frame or a video object, thereby eliminating the additional information to be transmitted on a macroblock basis effectively. FIG. 23 shows a difference of the transmission bitstream 21 of this embodiment from the transmission bitstream 21 of FIG. 20 of the first embodiment. The bitstream of FIG. 23 represents a frame based change of the memories to be used for prediction with the prediction memory indication information 800 included in frame based header information. The bitstream of FIG. 23 may be effective, for example, in the case that the picture characteristic of a moving picture sequence changes infrequently including little changes locally on a macroblock level. Further, a decoder may be provided so as to decode the thus encoded bitstream to reproduce a frame or a video object.

Embodiment 7

With reference to the previous embodiments, two predicted picture candidates read out from an arbitrary plural number, two (e.g., memories a and b) for example, of the memories are subject to an arithmetic mean to obtain a picture as a member of the predicted picture candidates 6 or as the predicted picture 9. Further, a decoder may be provided so as to decode the thus encoded bitstream to reproduce a frame or a video object.

Embodiment 8

With reference to the encoders of the previous embodiments, a previously detected feature parameter representing the spatial complexity, perceptual significance and the like of a picture segment as a prediction unit may be utilized as tools for deciding a prediction mode and for judging the updating of the memories.

Figure 16:
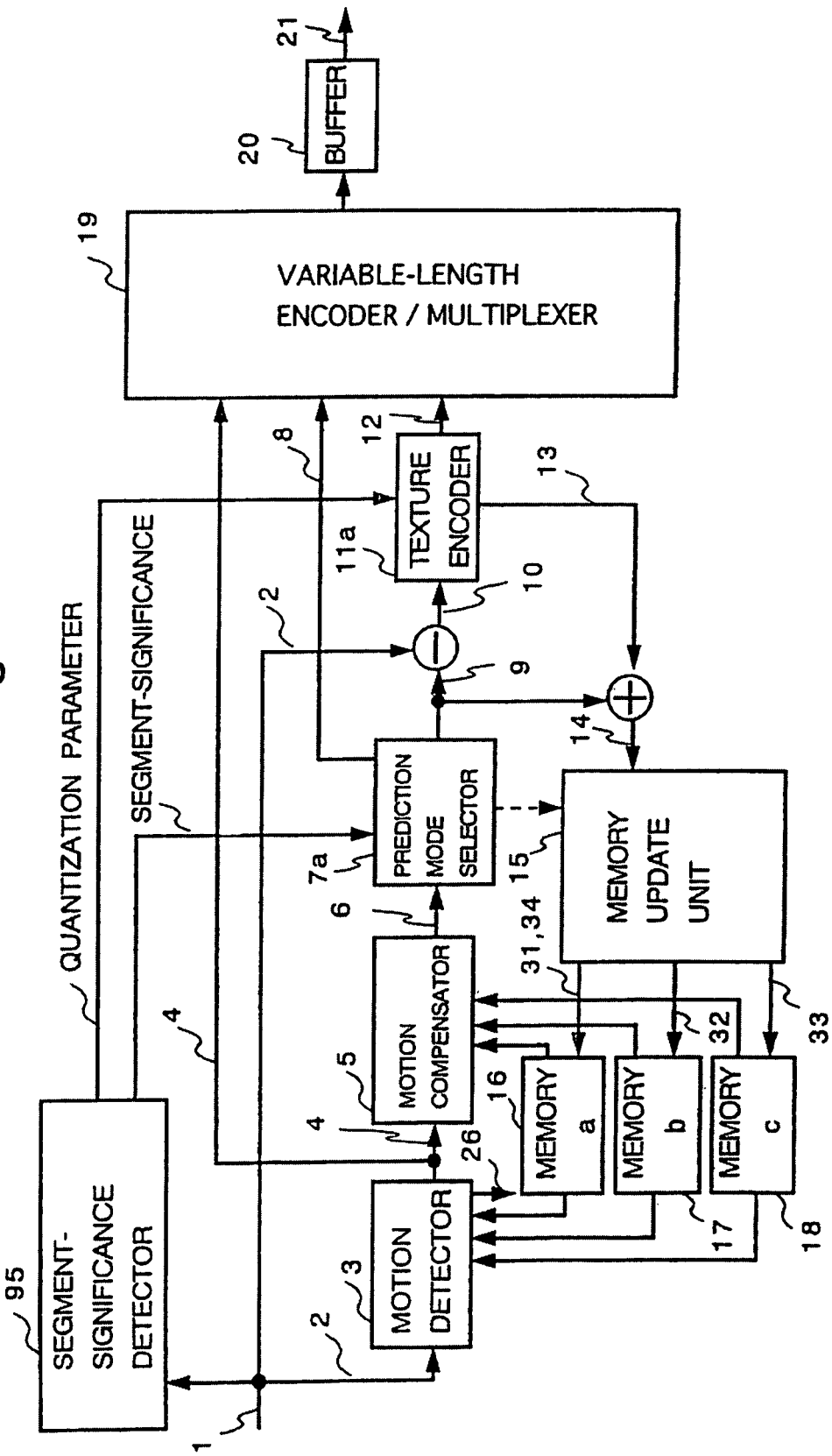
FIG. 16 is a structural diagram of a moving picture encoder according to another embodiment of this invention.

For example, a moving picture is assumed to include a motion too complicated to encode data in an acceptable quality within a given amount of encoding. In this case, significance is examined on a prediction picture segment (e.g., a macroblock, an arbitrary shaped picture segment, an arbitrary shaped block) basis. Consequently, a low quality encoding is assigned to some extent to a less significant segment in order to save some amount of encoding for a more significant segment, thereby improving an overall picture quality. With the encoders of this invention where two or more memories are switched interchangeably at an arbitrary timing to be used for prediction, a more adaptive prediction can be achieved in response to the characteristic of a picture, through detecting a feature parameter representing the significance of a prediction picture segment and then determining the use of the memories dynamically based upon a detected feature parameter. For example, as shown in FIG. 16, a segment-significance detector 95 is provided for detecting the feature parameter on a segment basis to determine the significance of the segment. The segment-significance detector 95 transfers a segment-significance to a prediction mode selector 7a and a quantization parameter based upon the segment-significance to a texture encoder 11a. With a segment judged more significant in the segment-significance detector 95, a most complex mode among two or more prediction modes available is used for prediction. Specifically, reference pictures from the respective memories a, b, c are used to obtain the motion parameters and the predicted pictures, respectively, based upon a complex motion model. In the prediction mode selector 7a, a prediction mode having the highest prediction efficiency is selected from among modes including an arbitrary combination (e.g., an arithmetic mean) of the predicted pictures. At the same time, reference pictures of all the memories used for prediction are updated. The texture encoder 11a performs an encoding using a quantization parameter having a smaller quantization step size. With a less significant segment, a simplified prediction mode (i.e., a parallel translation amount detection using a single memory) is employed for prediction and a quantization parameter having a larger quantization step size is utilized for encoding, regardless of the amplitude of an obtained prediction error signal, so that an amount of encoding be reduced. Through this control, a less significant segment reduces its picture quality to some extent and a more significant segment maintains its quality through a high-quality prediction, thereby improving an overall quality within a given amount of encoding.

Embodiment 9

Figure 17:
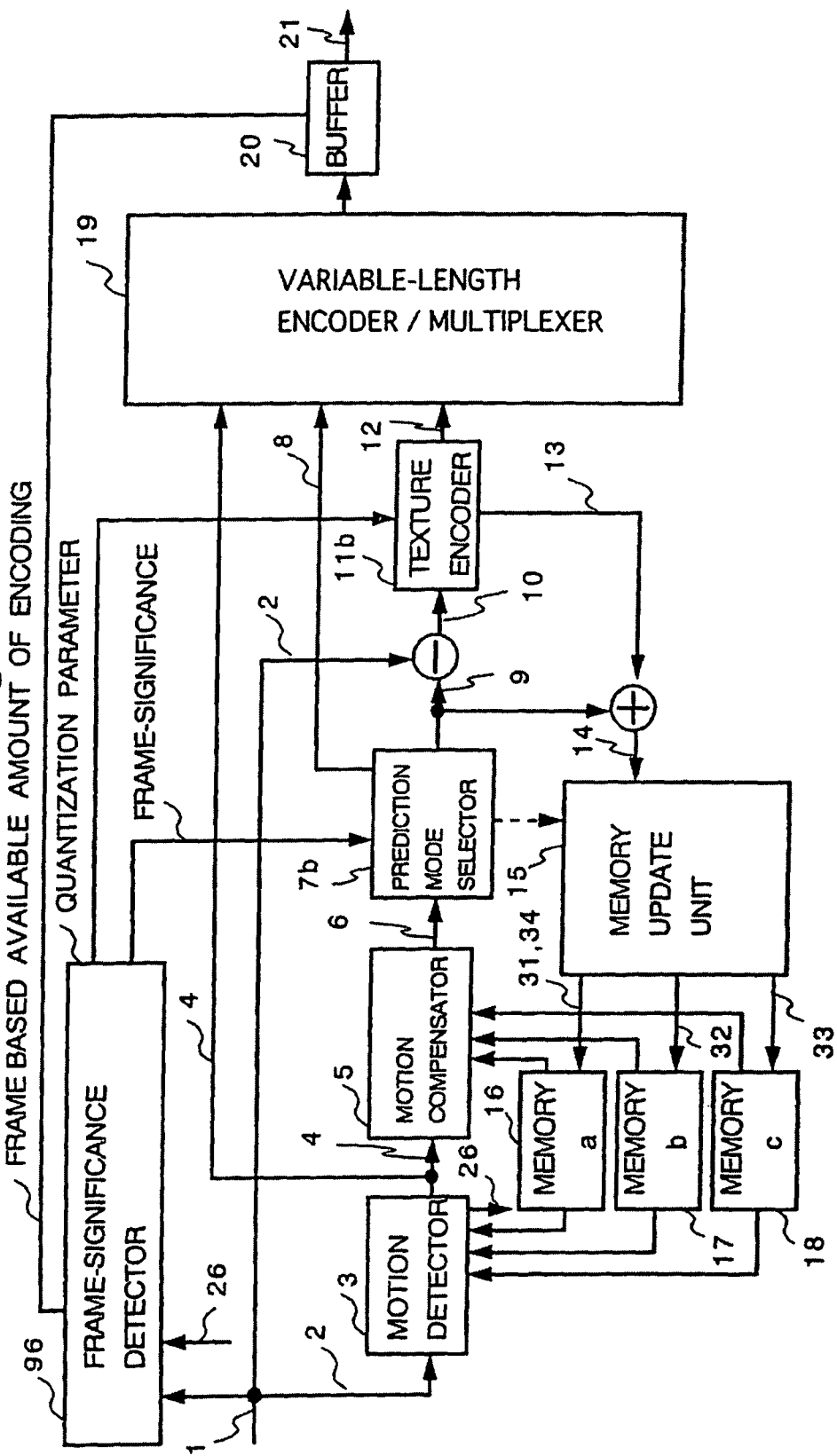
FIG. 17 is a structural diagram of a moving picture encoder according to another embodiment of this invention.

In an encoder where a moving picture sequence is predicted and encoded by using two or more memories, a parameter representing an amount of encoding available for the moving picture sequence at each time instance, an amount of a change in a scene at a certain time instance (e.g., a scene change detection), or the feature parameter or significance of a prediction picture segment described in the eighth embodiment may be detected previously. The values of these parameters may be used for predicting a picture at a particular time instance in a prediction system. Alternatively, these values may be utilized as judging tools for selecting a reference memory area in a prediction system. A frame-significance detector 96 may be provided for determining the significance on a frame basis as shown in FIG. 17. The frame-significance detector 96 detects, for example, an amount of a change in a motion between the current and the previous frame (e.g., a scene change detection by the scene change detector 80), the appearance of a new object or the disappearance of an object or the like. A final significance of the current frame is determined in consideration of an amount of encoding available for the current frame informed by the transmission buffer 20. Based upon the final significance, a more significant frame may be predicted by using all the prediction methods and reference memory areas available for the maximum possible improvement of prediction efficiency, whereas a less significant frame is predicted in a limited use of the prediction methods and the reference memory areas for a simplified encoding so as to reduce the throughput. An alternative encoder for performing intra-frame coding alone involving no prediction at a scene change may be possible. In addition, a more sophisticated quality control may be achieved with a joint use of the segment-significance detector 95 discussed in the eighth embodiment. Through this control, a less significant frame reduces its quality to some extent and a more significant frame maintains its quality by a high-quality prediction, thereby improving an overall picture quality within a given amount of encoding.

The idea of this embodiment is also applicable to a software based encoding being associated with unsteady transaction processes and unsteady size of available storage in order to achieve an efficient encoding in the maximum use of available resources. This reduces a throughput with a less significant frame, thereby accelerating a general processing speed.

Embodiment 10

In an encoder where a moving picture sequence including two or more video objects is predicted and encoded by using two or more memories, as shown in FIG. 11, a parameter representing a gross amount of encoding available for the sequence, an available amount of encoding of a video object at each time instance, an amount of a change in a video object at each particular time instance (e.g., the appearance/disappearance of an object), a level of significance/attention of a video object in a particular scene, or the feature parameter or significance of a prediction picture segment discussed in the eighth and ninth embodiments may be detected previously. The values of these parameters may be utilized for predicting a video object at each particular time instance. Alternatively, these values may be utilized as judging tools for selecting a reference memory area.

Figure 18:
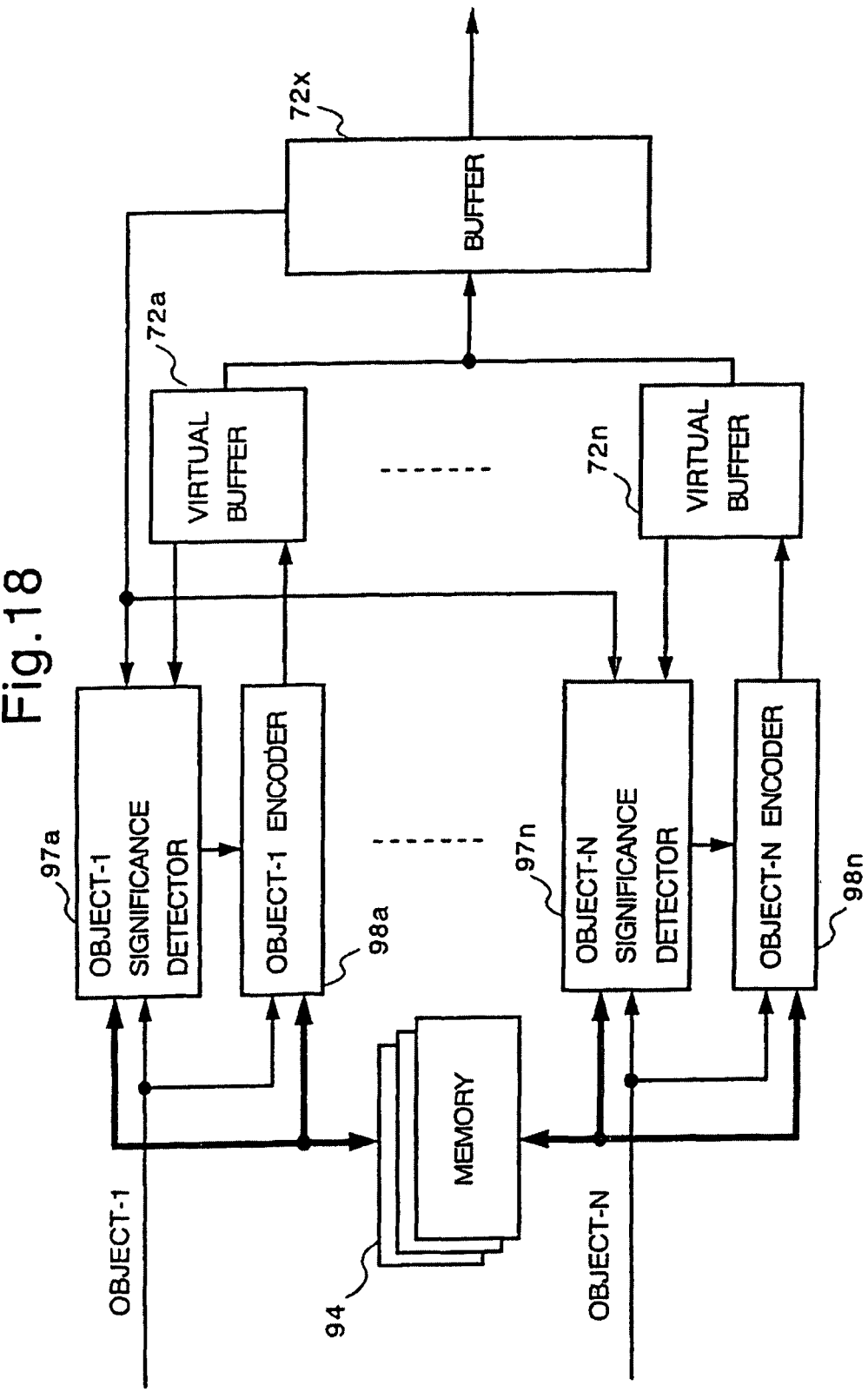
FIG. 18 is a structural diagram of a moving picture encoder according to another embodiment of this invention.

For example, as shown in FIG. 18, significance detectors 97*a* through 97*n* responsive, respectively, to objects 1 through n may be provided for detecting a parameter representing an amount of a change in an object at each time instance, or the appearance/disappearance of an object. In addition, the significance of an object at each time instance is determined in consideration of the occupational proportion of a buffer 72*x* for storing the encoded data of all the objects and the occupational proportion of virtual buffers 72*a* through 72*n* for the respective objects. When a new type of segment appears as a result of an object having another object overlapped in part, for example, then the following control may be applied to this type of segment because this type of segment has a great influence on prediction efficiency thereafter. A higher significance may be assigned to this type of segment to obtain an encoded picture in high quality even without enough space available for storage in the corresponding virtual buffer of the object. Significance detected in the significance detectors 97*a* through 97*n* is transferred to object 1 through N encoders 98*a* through 98*n*, where a full use of the prediction methods and the reference memory areas available is allowed to a more significant object so as to improve prediction efficiency to the maximum, whereas a limited use of the prediction methods and the reference memory areas is assigned to a less significant object so as to simplify the encoding, thereby reducing the throughput. Further, with an encoder for encoding objects decomposed from a frame through a real time separation, when a considerable amount of a change occurs in the contents of the object due to the appearance of a new object or the disappearance of an existing object, the object may be subject to intra-frame coding alone with no prediction involved. A more sophisticated quality control may be achieved on a prediction segment basis of an object in a joint use of the object 1 through N encoders 98*a* through 98*n* and the segment-significance detector 95 discussed in the eighth embodiment. Through this control, a less significant object is reduced in quality to some extent and a more significant object manages to maintain its quality through a sophisticated prediction, thereby improving an overall quality within a given amount of encoding.

Embodiment 11

Figure 19:
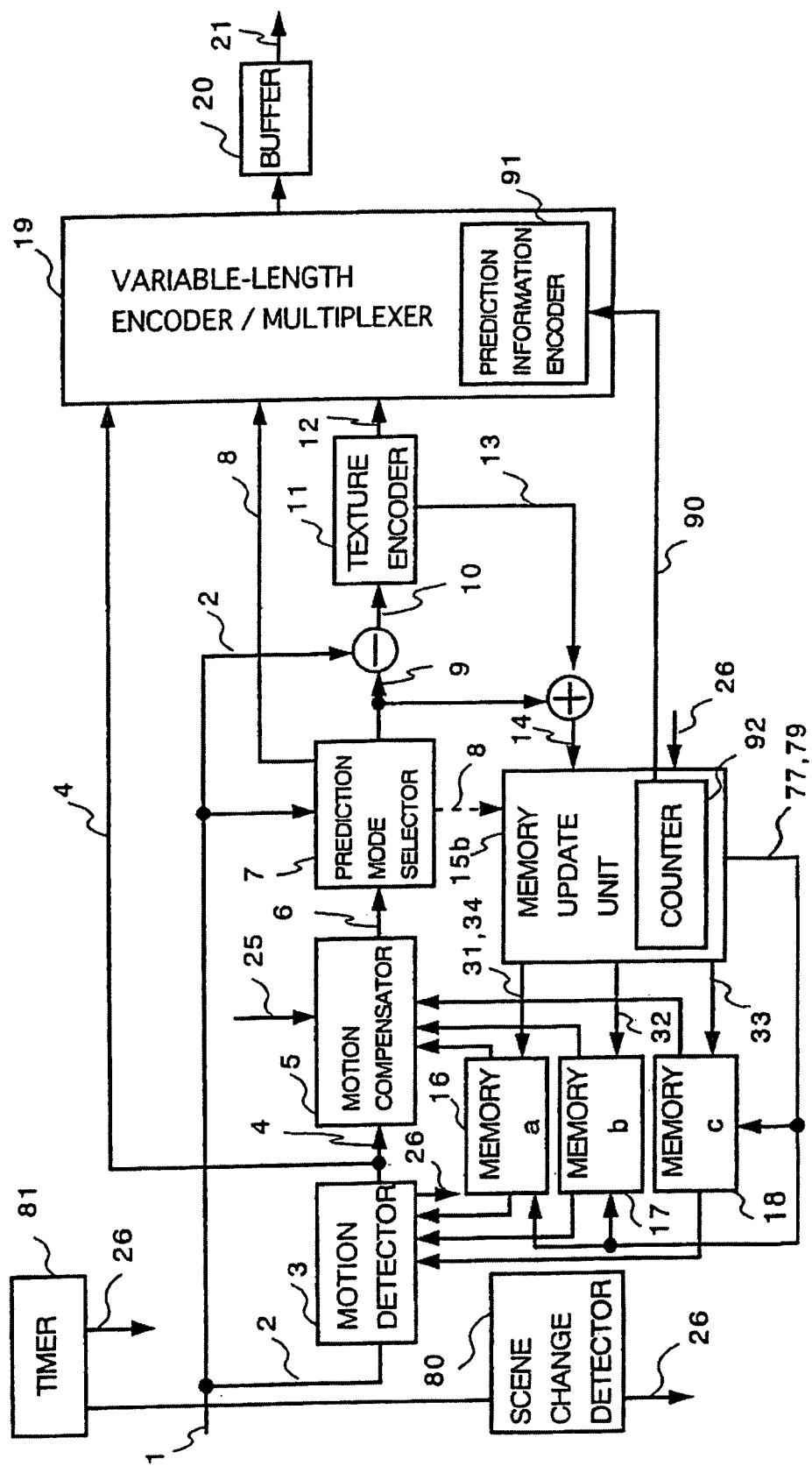
FIG. 19 is a structural diagram of a moving picture encoder according to another embodiment of this invention.

An alternative encoder may be provided with a prediction information encoder 91 for allocating a code (encoding) to prediction relating encoding information (e.g., a reference memory number) as shown in FIG. 19.

In the encoder where a moving picture sequence or a video object is predicted and encoded by using the memories a, b, c, the memories may be ranked based upon frequency in use for prediction with ranks being updated dynamically during an encoding operation. Consequently, a code allocation is performed to the prediction relating encoding information (e.g., a reference memory number) based upon the ranks of the respective memories used for prediction in the prediction information encoder 91.

For example, in the encoder of FIG. 19, the memory update unit 15*b* may be provided with a counter 92 which counts the times of the respective memories a, b, c to be used for prediction, ranks the memories a, b, c based upon counted values, and outputs resultant ranking information 90. This ranking may be performed on a picture (VOP) basis at a particular time instance of a frame or a video object, and alternatively, on a smaller unit basis of a prediction picture segment (e.g., a macroblock, an arbitrary shaped segment, and an arbitrary shaped block).

This shows how often the respective memories are used for prediction. A memory in a frequent use for prediction is the most significant for prediction, and thus, a high frequency in use for reference corresponding to a high rank.

When encoding information on the frequency in use for prediction of the memories on a prediction picture segment basis, a memory in a frequent use for reference (i.e., a high-rank memory) is allocated a short code to enhance encoding efficiency.

In addition, if the motion parameter detected on a prediction picture segment basis is allocated a code length in response to the rank of a memory used for reference, then a shorter code may be assigned to a motion parameter value generated frequently, thereby achieving an efficient encoding of the prediction information. This may be materialized with an alternative encoder where the prediction information encoder 91 in the variable-length encoder/multiplexer 19 receives the ranks of the respective memories from the counter 92 in the memory update unit 15*b* and encodes the prediction information using a variable-length code based upon the ranking information 90.

Embodiment 12

Figure 24:
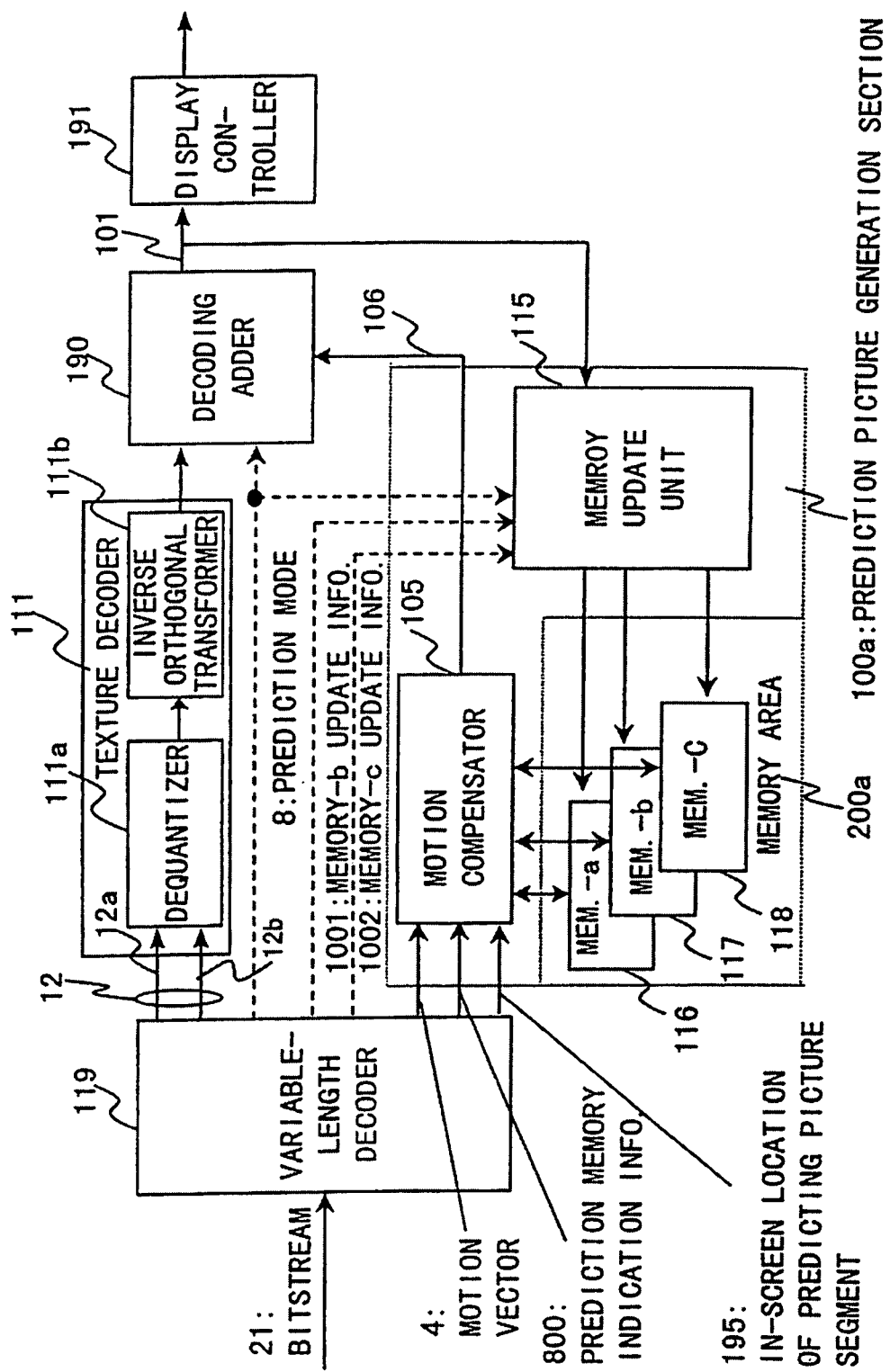
FIG. 24 is a structural diagram of a moving picture decoder according to another embodiment of this invention.

FIG. 24 shows the configuration of a picture decoder where an encoded digital picture through compression is reproduced through expansion according to another embodiment. In the figure, the encoded bitstream 21, a variable-length decoder 119, the quantized DCT coefficient 12, a quantization orthogonal transform coefficient 12*a*, a quantization step 12*b*, a texture decoder 111, a dequantizer 111*a*, an inverse orthogonal transformer 111b, a decoding adder 190, a decoded picture 101, a display controller 191, the prediction mode 8, memory-b update information 1001, memory-c update information 1002, the motion vector 4 (a motion parameter), the prediction memory indication information 800, an in-screen location 195 of a prediction picture segment, a motion compensator 105, a memory-a 116, a memory-b 117, a memory-c 118, a memory update unit 115, and a predicted picture 106 are shown. The motion compensator 105 and the memory update unit 115 form a prediction picture generation section 100a. The memories a, b, c form a memory area 200a.

According to this embodiment, the memory-a is assumed to be a frame memory designed to store a frame of picture data, the memory-b is assumed to be a static sprite memory, and the memory-c is assumed to be a dynamic sprite memory. The decoder of this embodiment is assumed to receive the bitstream 21 of FIG. 22. Although not shown in FIG. 22, the memory-b update information 1001 and the memory-c update information 1002 are assumed to be transmitted in the bitstream. The memory-b update information 1001 is assumed to include an update indication for a full updating of the static sprite memory and picture data for the full updating. Similarly, the memory-c update information 1002 is assumed to include an update indication for a full updating of the dynamic sprite memory and picture data for the full updating.

The operation of the thus configured decoder is described below. The variable-length decoder 119 analyzes the bitstream 21 and decomposes it into separate encoded data. The quantization orthogonal transform coefficient 12a is transferred to the dequantizer 119a to be dequantized by using the quantization step 12b. A dequantized result is subject to inverse orthogonal transformation in the inverse orthogonal transformer 111b to obtain a decoded texture, which is transferred to the decoding adder 190. Orthogonal transformation employed here is the same as that employed in an encoding station such as Discrete Cosine Transformation (DCT).

The motion compensator 105 inputs the motion vector 4, the prediction memory indication information 800, and information indicating the in-screen location 195 of a prediction picture segment included in the bitstream 21, all of which are decoded in the variable-length decoder 119. The motion compensator 105 reads out a right predicted picture from reference pictures stored in the memories a, b, c based upon the three kinds of information. The in-screen location 195 of a prediction picture segment can be obtained by counting the number of macroblocks, other than from the information included in the bitstream. The process of generating a predicted picture will be discussed in a later section for describing the operation of the motion compensator 105 in detail.

The decoding adder 190, based upon the information of the prediction mode 8, outputs an output from the inverse orthogonal transformer 111b directly as the decoded picture 101 with a block through intra-frame coding, and, with a block through inter-frame coding, adds an output from the inverse orthogonal transformer 111b to the predicted picture 106 to be outputted as the decoded picture 101. The decoded picture 101 is transferred to the display controller 191 to be outputted to a display device and also transferred to the memories a, b, c to be stored as a reference picture for a later use in decoding. A memory writing operation is controlled by the memory update unit 115 based upon the prediction mode 8.

A predicted picture generation performed in the motion compensator 105 in the prediction picture generation section 100a is now discussed. According to this embodiment, the prediction method of a picture is determined based upon the prediction memory indication information 800. The decoder of this embodiment generates a predicted picture using a reference picture through predetermined coordinate transformation and interpolation based upon the motion vector 4 and the prediction memory indication information 800. Coordinate transform methods are assigned previously to the respective memories to be used for prediction. For example, the following approaches are possible similar to the picture transform methods described in the third embodiment.

(1) the memory-a used for prediction (with the prediction memory identification information 800 indicating the use of the memory-a)

The coordinates of each pixel of a prediction segment are translated based upon the motion vector and picture data at a corresponding location in the memory-a is read out as the predicted picture.

(2) the memory-b used for prediction (with the prediction memory identification information 800 indicating the use of the memory-b)

An affine transform expression is found based upon the motion vector, the coordinates of each pixel of a prediction segment are displaced based upon the transform expression, and picture data at a corresponding location in the memory-c is read out as a predicted picture.

(3) the memory-c used for prediction (with the prediction memory identification information 800 indicating the use of the memory-c)

A perspective transform expression is found based upon the motion vector, the coordinates of each pixel of a prediction segment are displaced based upon the transform expression, and picture data at a corresponding location in the memory-b is read out as a predicted picture.

Figure 25:
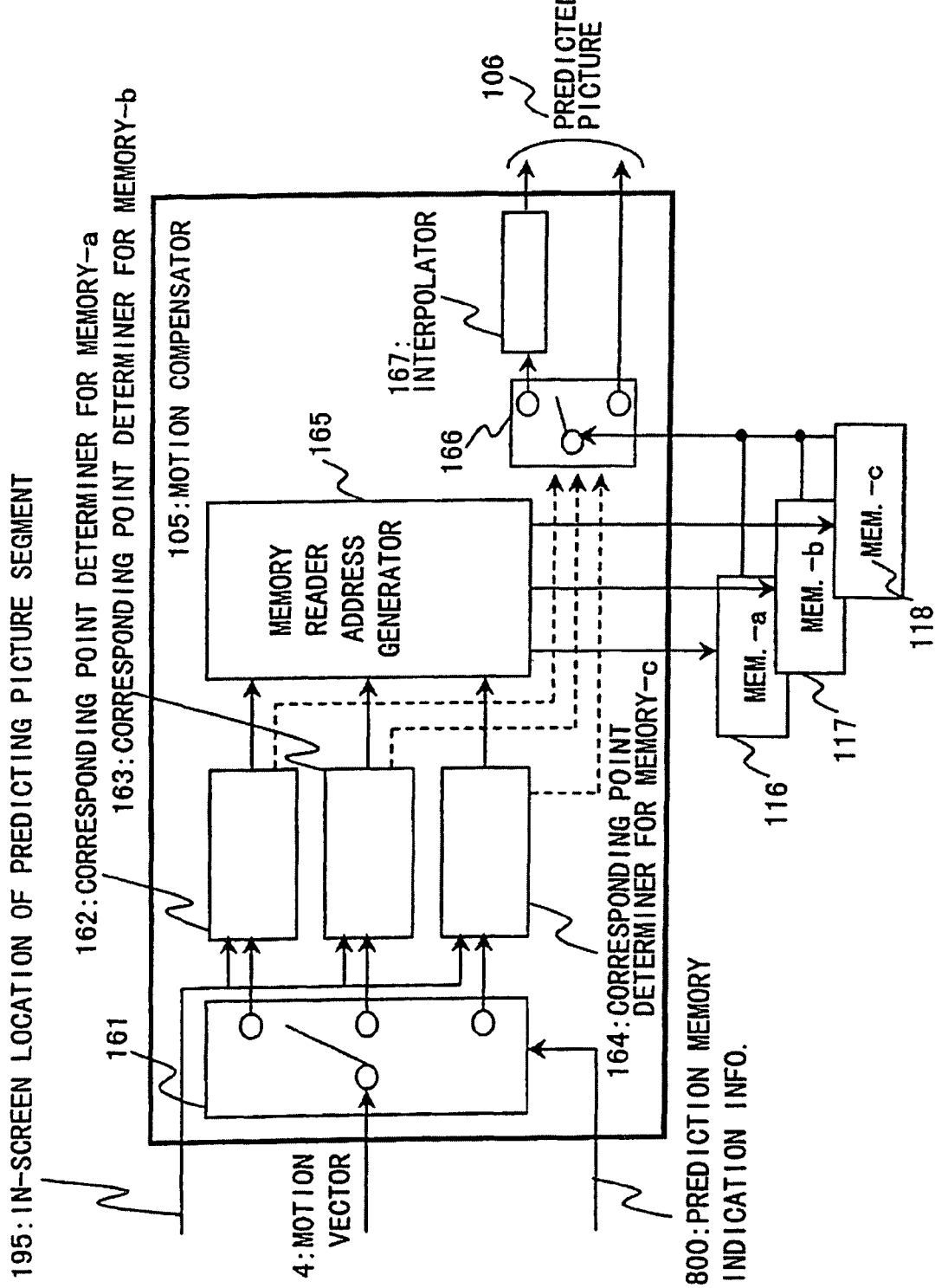
FIG. 25 is a structural diagram illustrating the configuration of a motion compensator of the moving picture decoder according to the embodiment of this invention.
Figure 26:
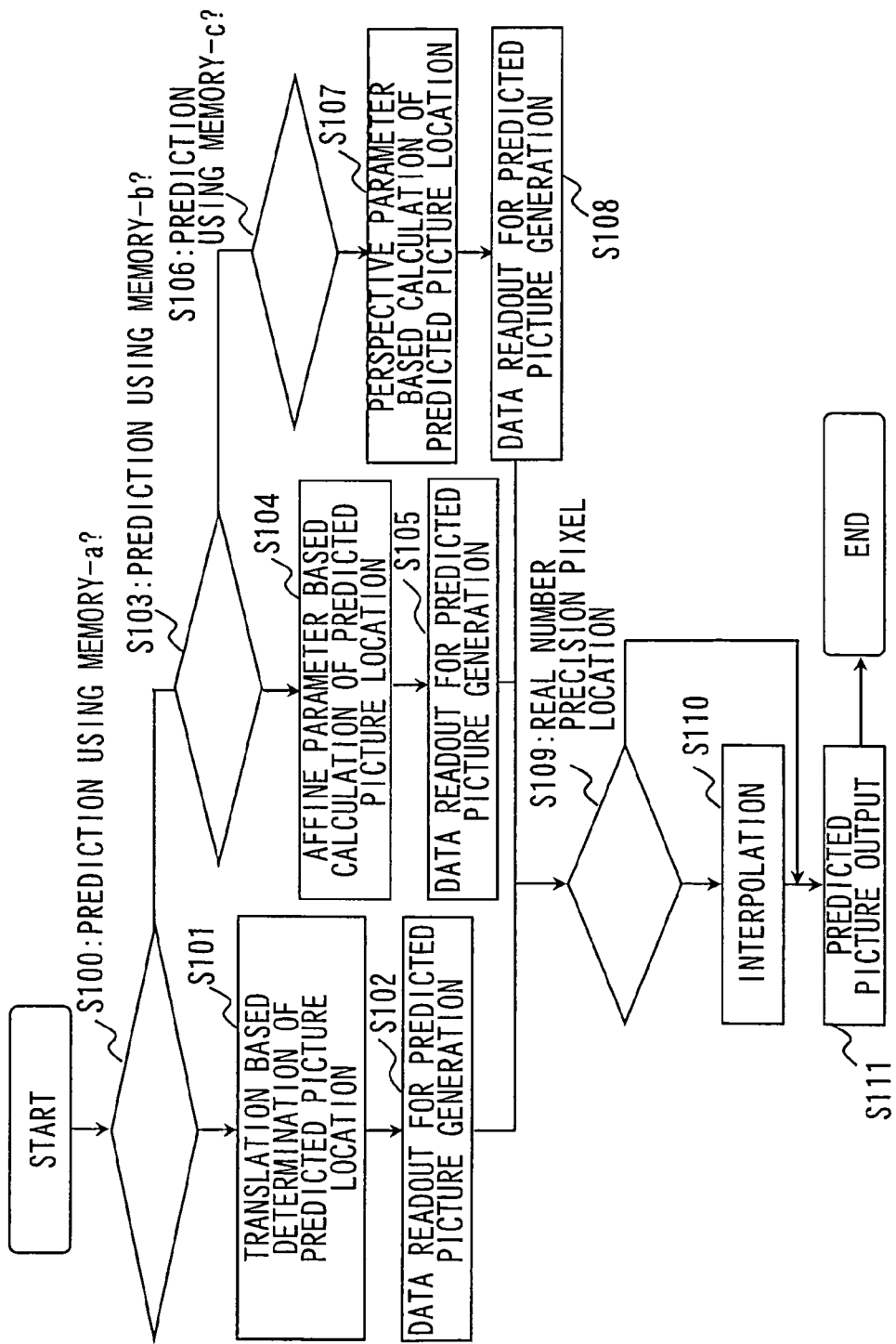
FIG. 26 is a flowchart illustrating an operation of the motion compensator.
Figure 27:
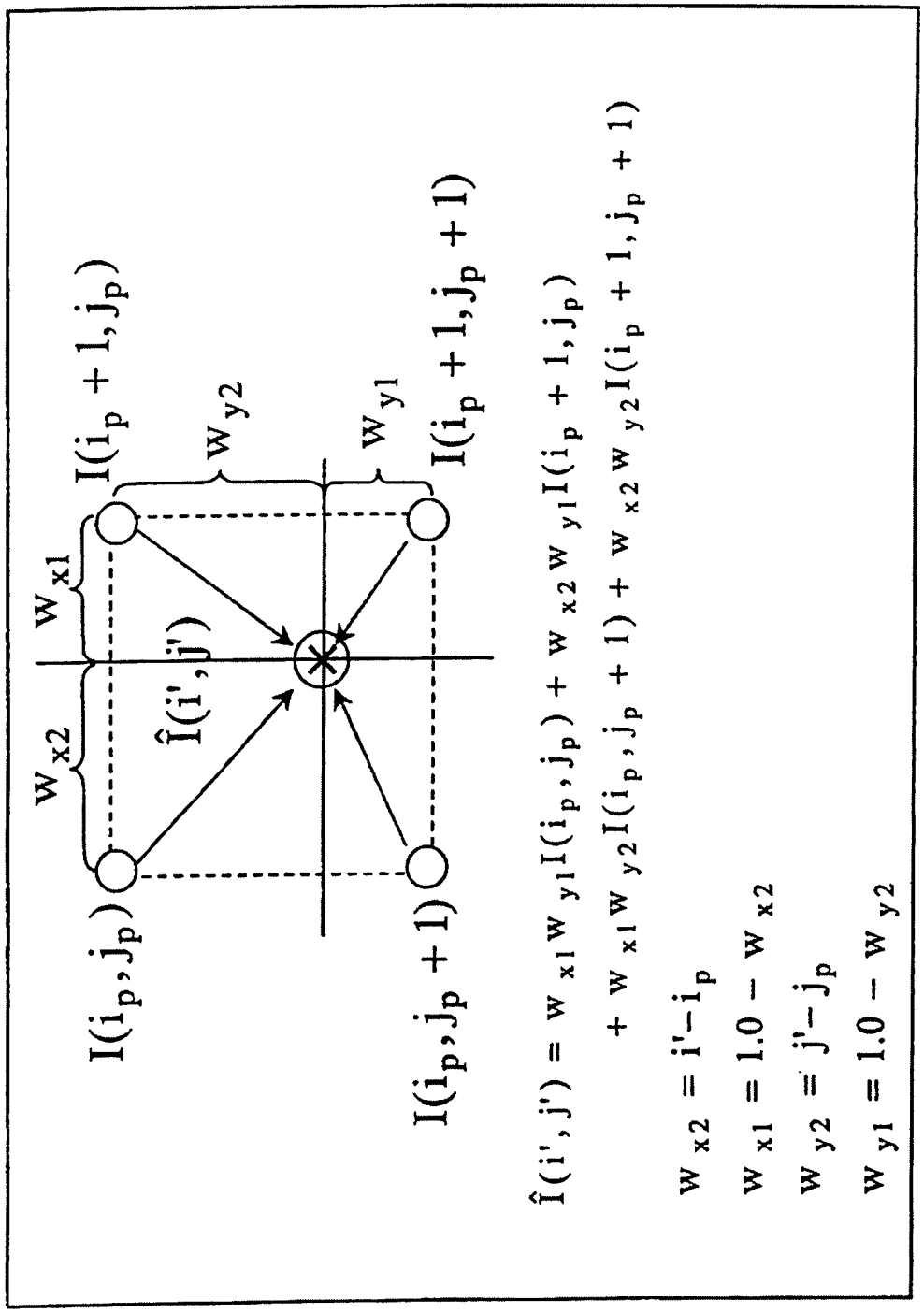
FIG. 27 is an exemplary diagram of interpolation.

FIG. 25 shows the configuration of the motion compensator 105 in detail. In the figure, a switch 161, a corresponding point determiner 162 for the memory-a, a corresponding point determiner 163 for the memory-b, a corresponding point determiner 164 for the memory-c, a memory read address generator 165, a switch 166, and an interpolator 167 are shown. FIG. 26 is a flowchart illustrating the optation of the motion compensator 105.

The operation of the motion compensator 105 of this embodiment is described below with reference to FIGS. 25 and 26.

1) Determining a Corresponding Point

Initially, the corresponding point determiner of a corresponding memory is selected by the switch 161 based upon the prediction memory indication information 800. The vector 4 is then inputted to a selected corresponding point determiner. In this section, a predicted picture location corresponding to each memory is calculated, which is explained below with each memory.

1-1) The Memory-a Indicated by the Prediction Memory Indication Information 800 (Step S100)

A predicted picture location is calculated through parallel translation based upon a motion vector (step S101). Specifically, a predicted picture location (x',y') corresponding to a pixel at a prediction picture segment location (x,y) is determined based upon a motion vector (a, b) according to the following expression.

$$x'=x+a$$

$$y'=y+b$$

A determined predicted picture location is outputted to the memory read address generator 165.

1-2) The Memory-b Indicated by the Prediction Memory Indication Information 800 (Step S103)

An affine transform expression is determined based upon the motion vector 4. Specifically, an affine parameter (a, b, c, θ) of the following expression is determined by using the motion vector of a vertex of a rectangular area enclosing a prediction picture segment, $$x'=a(\cos\theta)x+a(\sin\theta)y+b$$

$$y'=a(-\sin\theta)x+a(\cos\theta)y+c$$

thereby obtaining the predicted picture location (x',y') corresponding to a pixel at the location (x,y) of a prediction picture segment to be outputted to the memory read address generator 165 (step S104).

1-3) The Memory-c Indicated by the Prediction Memory Indication Information 800 (Step S106)

A perspective transform expression is determined based upon a motion vector. Specifically, a perspective parameter (a, b, c, d, e, f) of the following expression is determined by using the motion vector of a vertex of a rectangular area enclosing a prediction picture segment, $$x'=(ax+by+c)/(gx+hy+1)$$

$$y'=(dx+ey+f)/(gx+hy+1)$$

thereby obtaining the predicted picture location (x',y') corresponding to a pixel at the location (x,y) of a prediction picture segment to be outputted to the memory read address generator (step S107).

2) Reading Out Data for Generating a Predicted Picture

Based upon the predicted picture location (x', y') outputted from a selected corresponding point determiner, the memory read address generator 165 generates a memory address for specifying the location of picture data required for generating a predicted picture in a reference picture stored in a memory, and reads out the data for generating a predicted picture (steps S102, 105, 108).

3) Generating a Predicted Picture

Among the component pixels of a predicted picture, with a pixel at an integer pixel location, the data for generating a predicted picture is used directly as a component pixel of a predicted picture, and with a pixel at a real number precision pixel location, the data for generating a predicted picture is subject to interpolation in the interpolator 167 to generate an interpolated pixel value (steps S109, S110, S111). FIG. 26 illustrates an interpolated pixel value generation. In FIG. 26, ($i_0$, $j_p$) denotes an integer pixel location, ($j^p$, $j^p$) denotes a real number precision pixel location, and w denotes a weight.

4) Updating a Memory (a Reference Picture)

Figure 28:
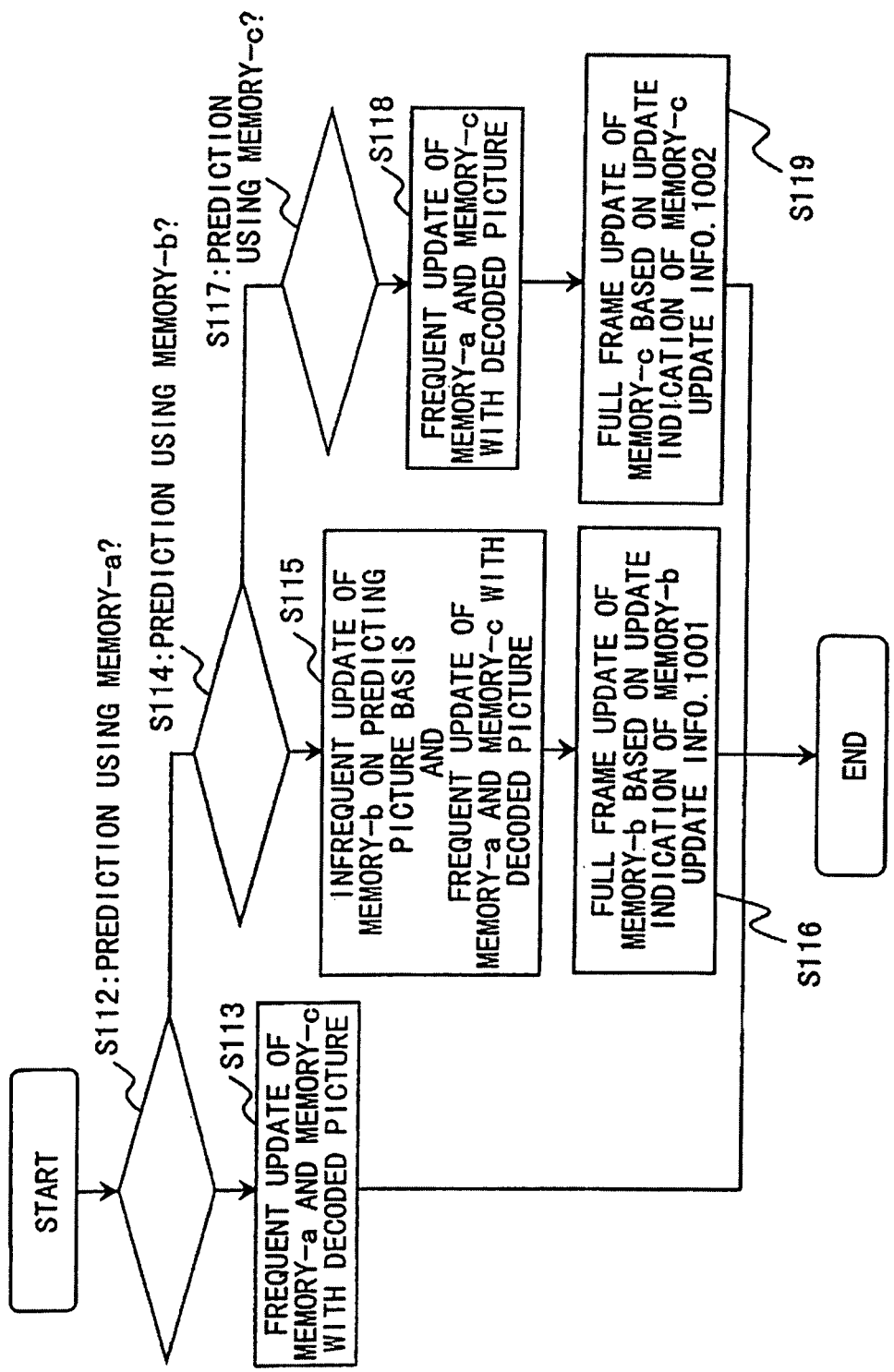
FIG. 28 is a flowchart illustrating an operation of a memory update unit of the moving picture decoder according to the embodiment of this invention.
Figure 29:
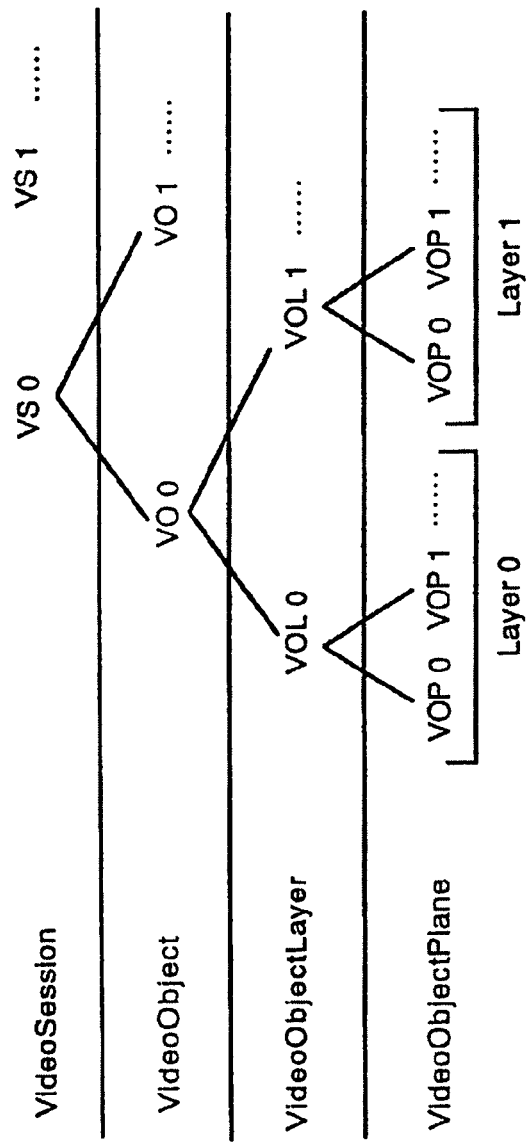
FIG. 29 is an exemplary diagram of a video data configuration according to the VM encoding system.
Figure 30:
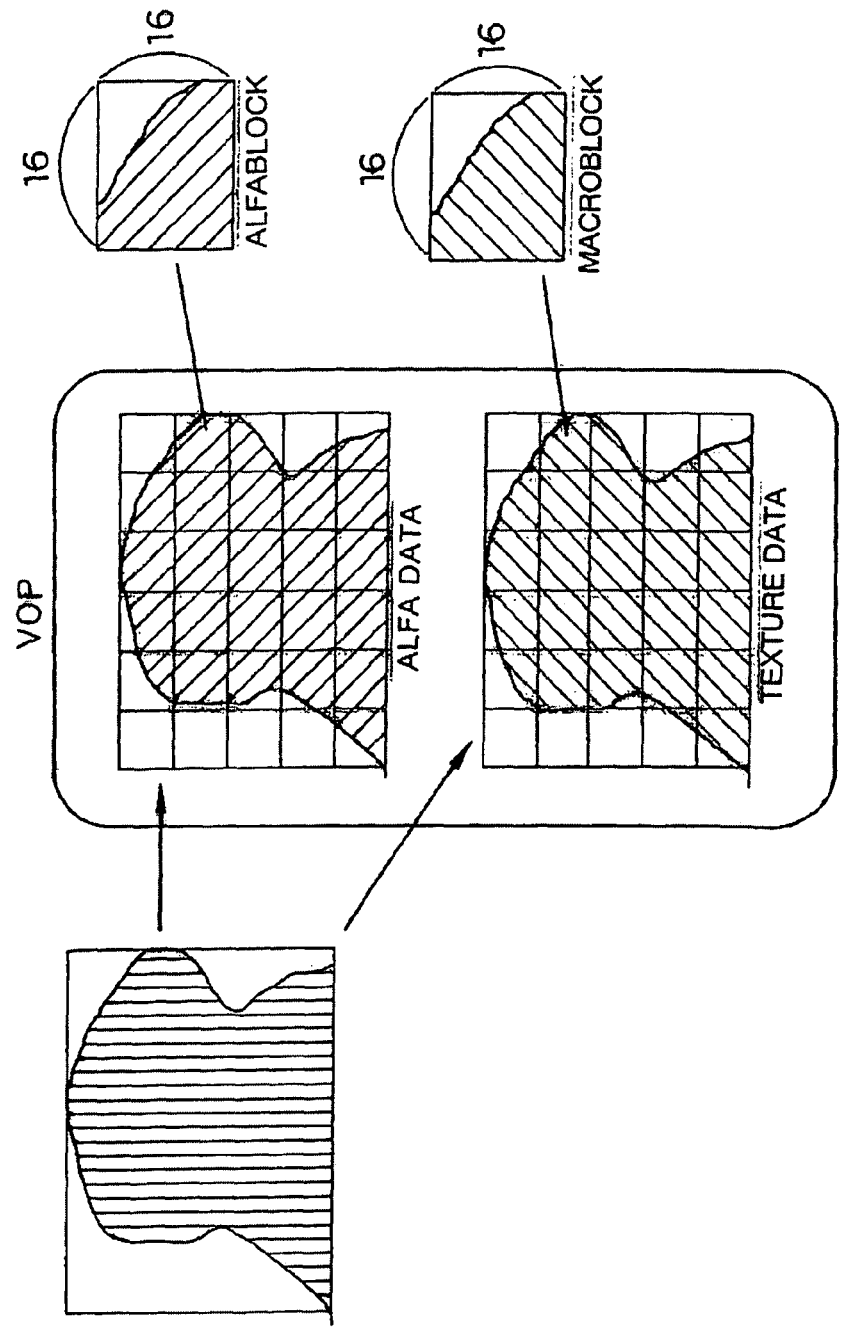
FIG. 30 is an exemplary diagram of a VOP data structure.
Figure 31:
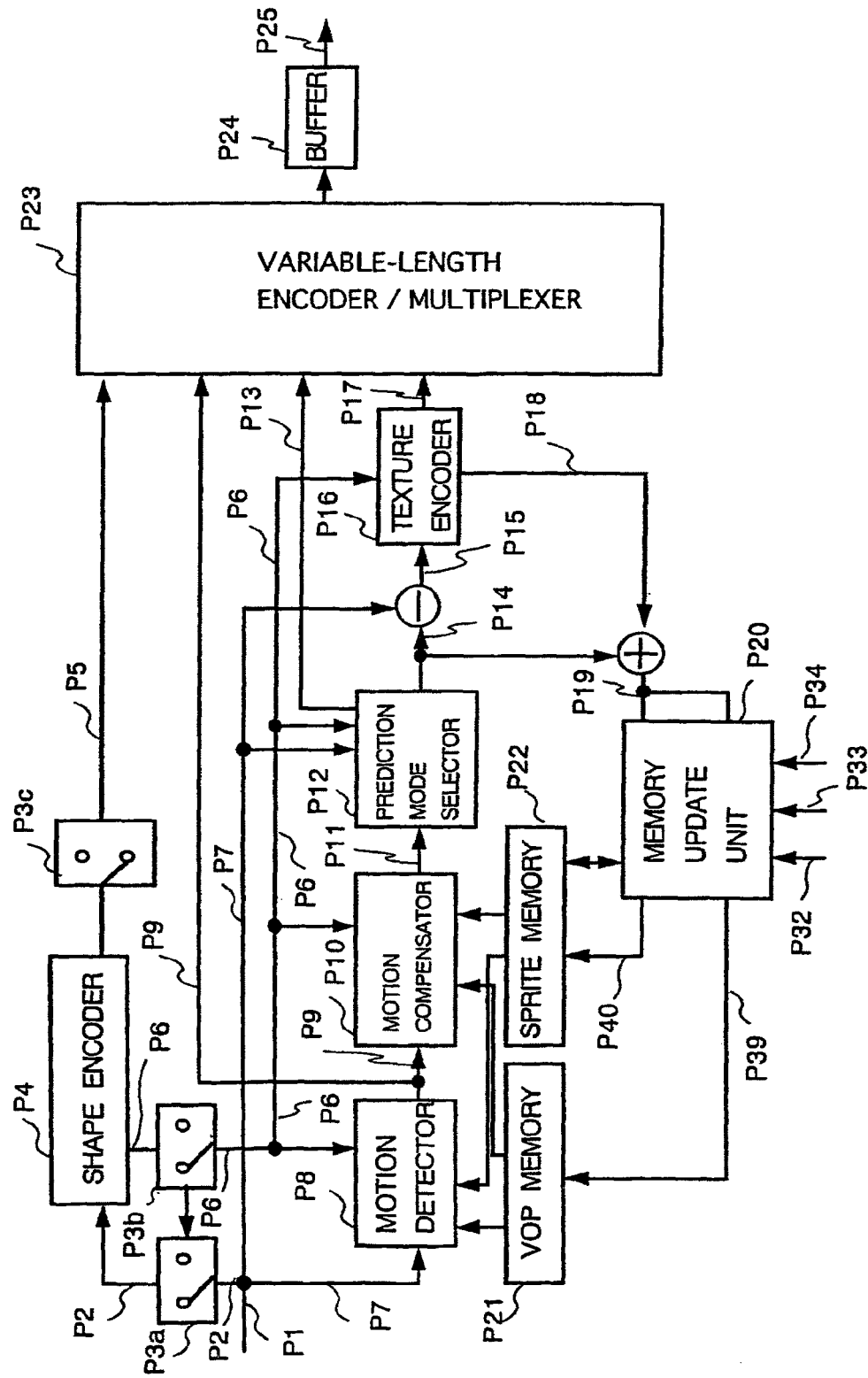
FIG. 31 is a structural diagram illustrating the configuration of a VM encoder.
Figure 32:
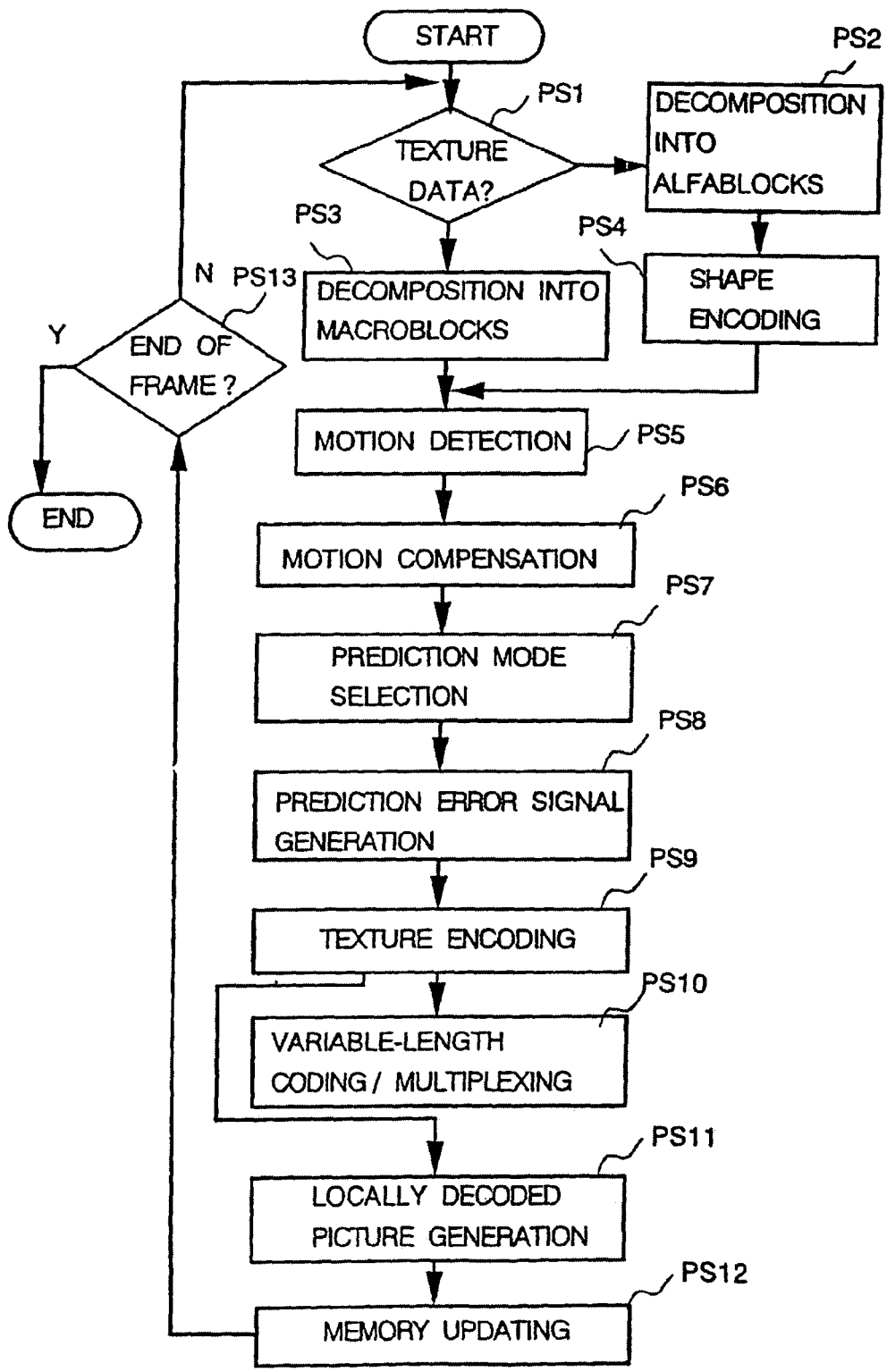
FIG. 32 is a flowchart illustrating an operation of the encoder of FIG. 31.
Figure 34:
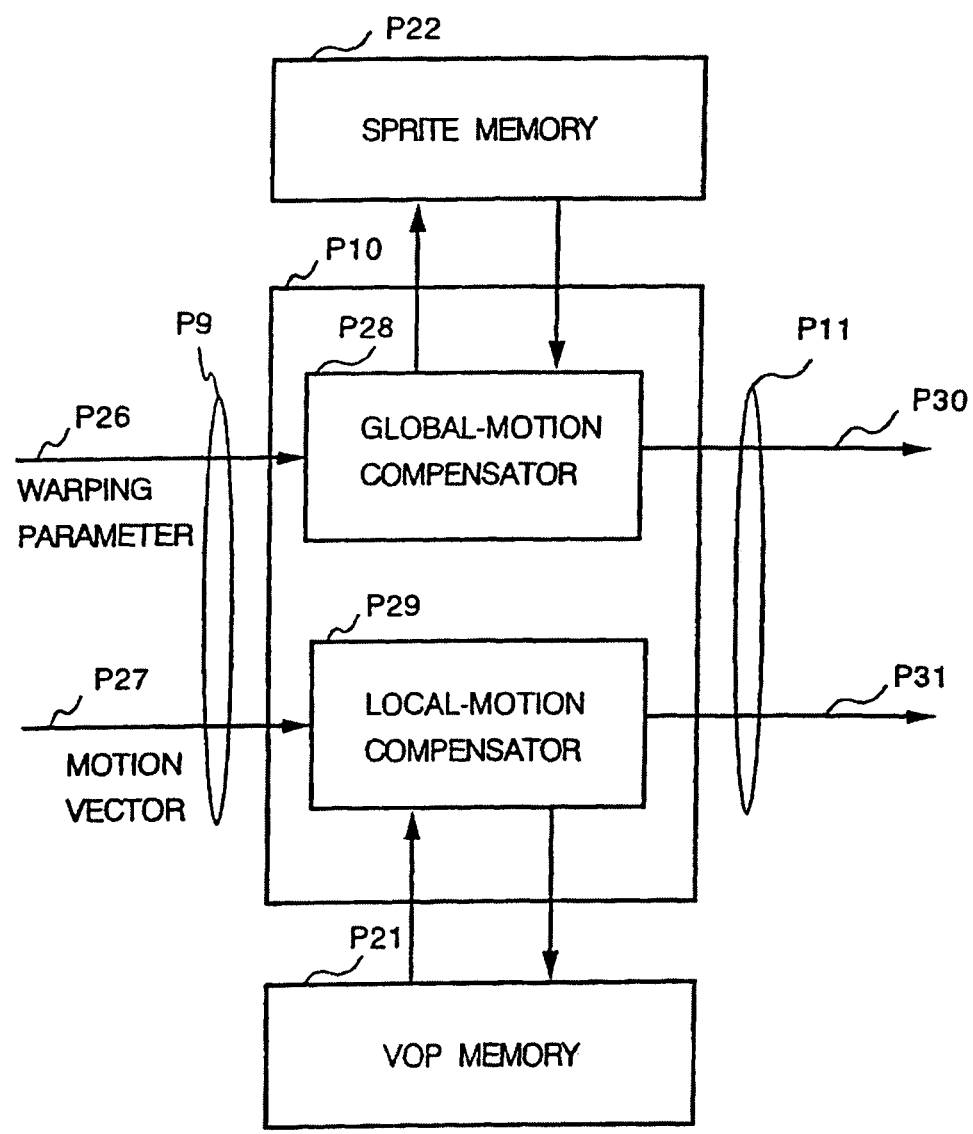
FIG. 34 is a structural diagram illustrating the configuration of a motion compensator of the encoder of FIG. 31.
Figure 35:
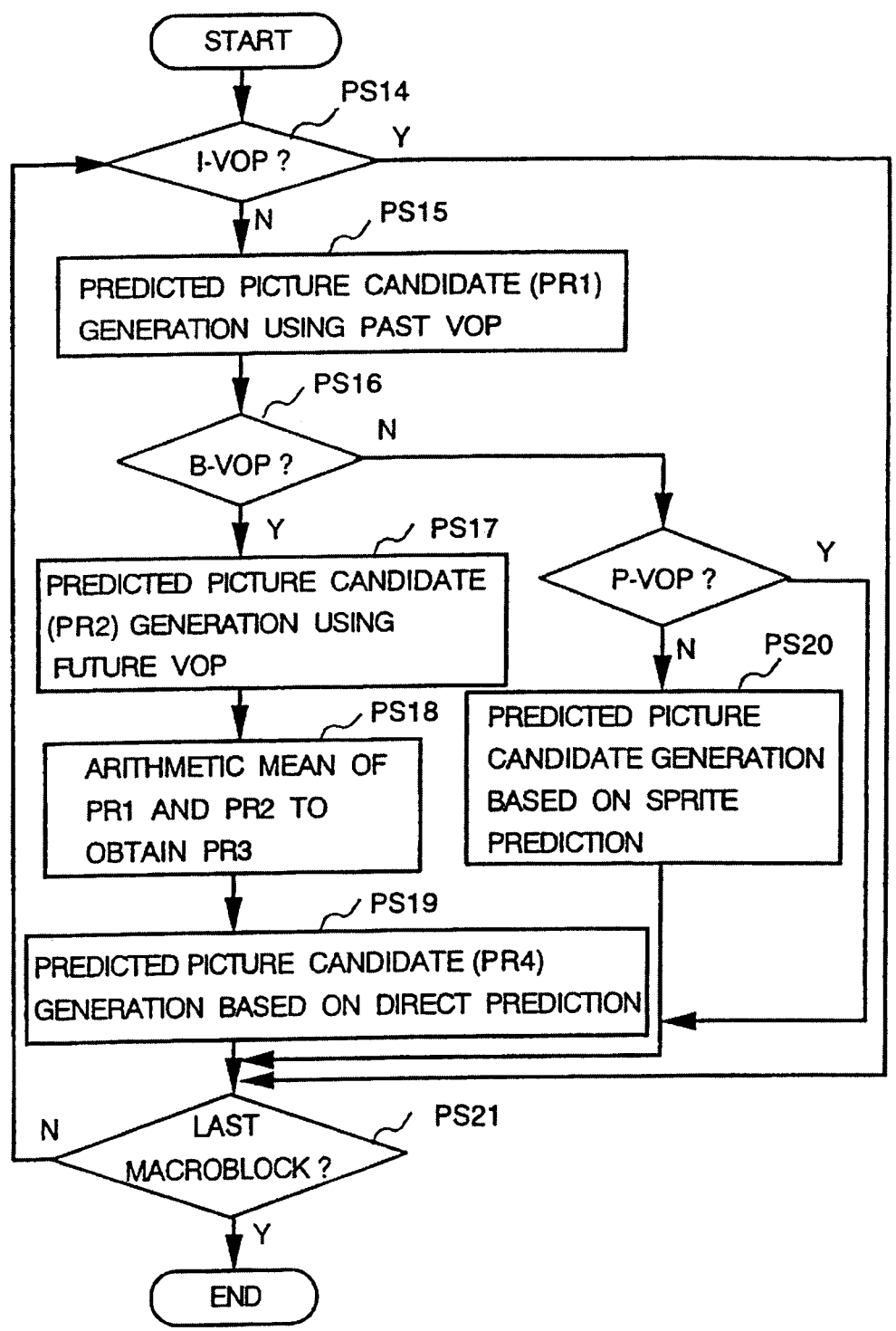
FIG. 35 is a flowchart illustrating an operation of the motion compensator of FIG. 34.
Figure 36:
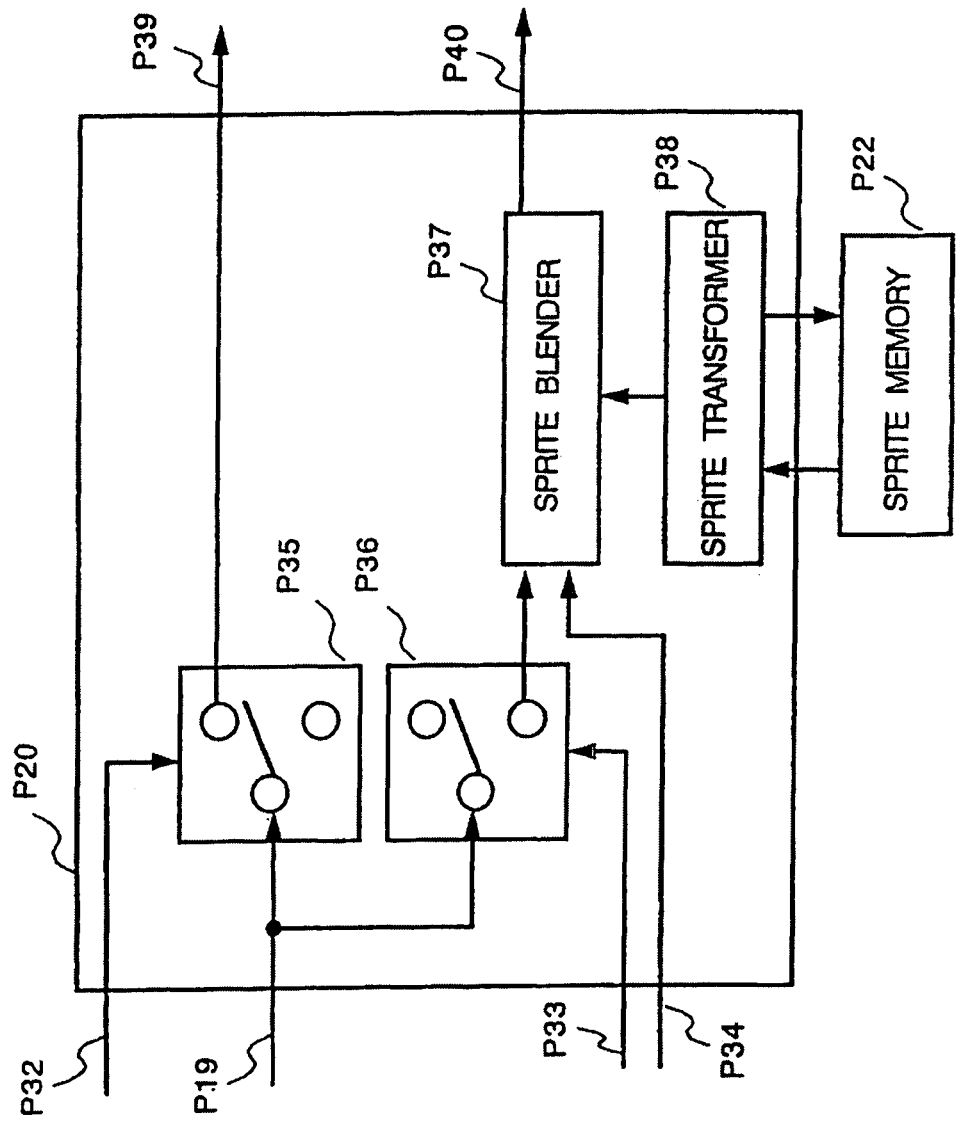
FIG. 36 is a structural diagram illustrating the configuration of a memory update unit of the encoder of FIG. 31.
Figure 37:
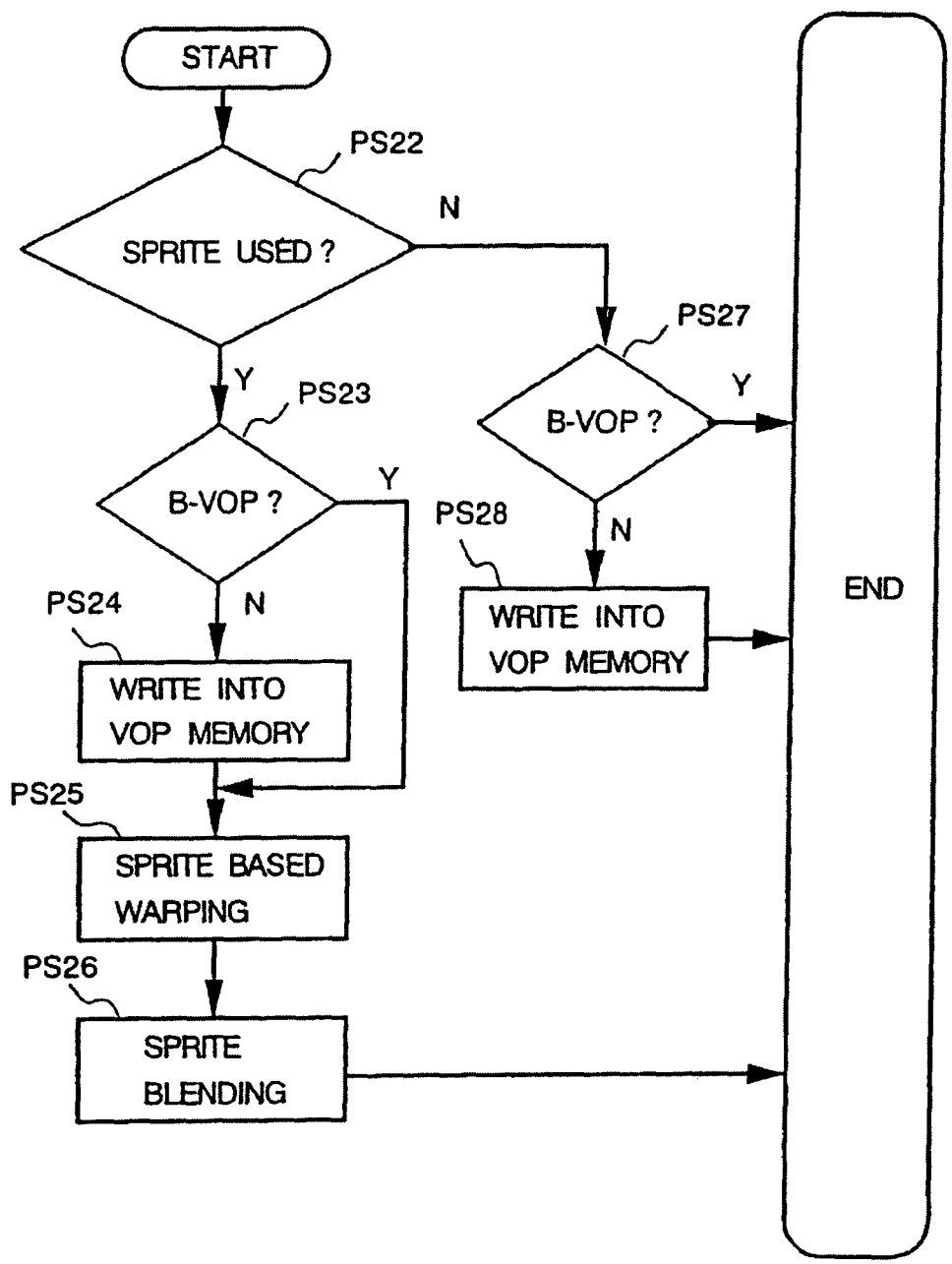
FIG. 37 is a flowchart illustrating an operation of the memory update unit of FIG. 36.

FIG. 28 shows a flowchart illustrating a control operation of the memory update unit 115. The memory update unit 115 controls an updating of the respective memories on a readout unit basis (e.g., a macroblock) of a predicted picture based upon the prediction mode 8 (or the prediction memory indication information 800). With the memory-a used for prediction (step S112), the contents of the memory-a and the memory-c are updated regularly with the decoded picture 101 (step S113). With the memory-b used for prediction (step S114), the reference picture of the memory-b is not updated on a readout unit basis of a predicted picture because of the memory-b being a static sprite memory, whereas the contents of the memory-a and the memory-c are updated regularly with the decoded picture 101 (step S115). When receiving the update indication by the memory-b update information 1001, then the memory update unit updates a full content of the memory-b with received picture data included in the memory-b update information 1001 (step S116). With the memory-c used for prediction (step S117), the contents of the memory-a and the memory-c are updated regularly by using the decoded picture 101 (step S118). When receiving the update indication by the memory update information, the memory update unit updates the content of the memory-c with received picture data included in the memory-c update information 1002 (step S119).

The use of the three memories a, b, c of this embodiment may be replaced by the use of two memories thereof, for example, with the memories a and b, that is, a frame memory and a static sprite memory. Alternatively, the memories a and c, that is, a frame memory and a dynamic memory, may be used.

As aforementioned, according to the decoder of this embodiment, the bitstream 21 encoded through an efficient prediction using the various kinds of motion parameters in response to the motion of a picture can be decoded. In addition, the decoder is applicable to the arbitrary updating approach of the contents of a reference picture at a timing determined in the encoding station, thereby achieving a more adaptive decoding in response to the characteristic of a picture.

According to this embodiment, if the bitstream includes a prediction error signal encoded through encoding other than orthogonal transform encoding, the same effect may be obtained by replacing a component for decoding a prediction error signal, other than the motion compensator and memory update unit.

Further, this embodiment may be applied not only to a decoder for decoding data on a fixed-size block basis, e.g., for decoding a normal television signal on a frame basis, but also to a decoder for decoding an arbitrary shaped video object (e.g., a Video Object Plane disclosed in ISO/IEC JTC1/SC29/WG11/N1902) as a unit without limiting a prediction segment to a fixed-size block.

INDUSTRIAL FEASIBILITY

As discussed above, the memory areas provided for storing reference pictures according to this embodiment enables the adaptive use of the memories for storing data based upon the characteristic of the moving picture sequence. In addition, the contents of one or more of the memory areas can be updated at an arbitrary timing, so that the content of a time-unvarying picture, such as a background picture, is controlled to be updated on a longer-term basis, and the contents of a locally changing picture segment is controlled to be updated on a regular or sequential basis. This achieves an efficient prediction by reflecting the past record of the moving picture sequence.

Further, the transform parameter value ranges are assigned to the memory areas for making the respective memory areas effective, and the memory areas are switched to be used for prediction among them based upon the value of the transform parameter of a prediction picture segment, thereby achieving an efficient prediction in response to the magnitude of a local/global motion of the moving picture sequence. At the same time, the motion parameters to be encoded on a prediction picture segment basis can be encoded efficiently within the effective motion parameter value ranges of the reference memory areas.

Further, to the respective memory areas, the transform methods becoming effective in the respective memories are assigned, and the memories are switched to be used for prediction among them in response to the type of the transform parameter of a prediction picture segment, thereby achieving an efficient prediction in response to the complexity of a local/global motion of the moving picture sequence. At the same time, the transform method can be selected adaptively in response to the characteristic of a prediction picture segment, thereby achieving an efficient encoding of the motion parameter.

What is claimed is:

1. A moving picture encoder for encoding a moving picture signal, the moving picture encoder comprising:

at least a first reference picture memory area and a second reference picture memory area, each area storing picture data of a reference picture to be used for prediction;

a prediction picture generator including a motion compensator that generates the predicted picture by using the picture data stored in the reference picture memory area, a parameter representing a motion between an image to be predicted and the reference picture and prediction mode information indicating a prediction mode corresponding to a prediction method used for generating a predicted picture, and a memory updater that judges whether to update the first reference picture memory area or the second reference picture memory area and if the first reference picture memory area is judged to be updated based upon a flag indicating a scene change detection with an arbitrary update criterion of updating the picture data of a full frame stored in the first reference picture memory area, the memory updater updates the picture data in an arbitrary period of time after detection of the scene change, wherein if the second reference picture memory area is judged to be updated, the memory updater immediately updates the picture data of a full frame stored in the second reference picture memory area; and a multiplexer that multiplexes an information representing memory update judgment in a bitstream.

2. A moving picture encoding method for encoding a moving picture signal, the moving picture encoding method comprising the steps of:

storing a picture data of a reference picture to be used for prediction in at least a first reference picture memory area and a second reference picture memory area;

generating a predicted picture by using the picture data stored in the reference picture memory area, a parameter representing a motion between an image to be predicted and the reference picture and prediction mode information indicating a prediction mode corresponding to a prediction method used for generating a predicted picture;

judging whether to update the first reference picture memory area or the second reference picture memory area;

if the first reference picture memory area is judged to be updated based upon a flag indicating a scene change detection with an arbitrary update criterion of updating the picture data of a full frame stored in tire first reference picture memory area, updating the picture data in an arbitrary period of time after detection of the scene change;

if the second reference picture memory area is judged to be updated, immediately updating the picture data of a full frame stored in the second reference picture memory area; and multiplexing an information representing memory update judgment in a bitstream.

* * * * *